United States Patent
Malinowski et al.

(10) Patent No.: US 12,030,134 B2
(45) Date of Patent: *Jul. 9, 2024

(54) APPARATUS AND METHOD FOR LASER PROCESSING A MATERIAL

(71) Applicant: Trumpf Laser UK Limited, Hedge End (GB)

(72) Inventors: Andrew Malinowski, Southampton (GB); Christophe Andre Codemard, Eastleigh (GB); Mikhail Nickolaos Zervas, Southampton (GB); Iain Botheroyd, Rugby (GB); Stephen John Keen, Bishops Tachbrook (GB); Malcolm Paul Varnham, Alresford (GB)

(73) Assignee: Trumpf Laser UK Limited, Hedge End (GB)

( * ) Notice: Subject to any disclaimer, the term of this patent is extended or adjusted under 35 U.S.C. 154(b) by 806 days.

This patent is subject to a terminal disclaimer.

(21) Appl. No.: 16/965,375

(22) PCT Filed: Feb. 1, 2019

(86) PCT No.: PCT/GB2019/000018
§ 371 (c)(1),
(2) Date: Jul. 28, 2020

(87) PCT Pub. No.: WO2019/150070
PCT Pub. Date: Aug. 8, 2019

(65) Prior Publication Data
US 2021/0362269 A1    Nov. 25, 2021

(30) Foreign Application Priority Data
Feb. 2, 2018  (GB) ...................... 1801796

(51) Int. Cl.
*B23K 26/06*    (2014.01)
*B22F 3/105*    (2006.01)
(Continued)

(52) U.S. Cl.
CPC ............ *B23K 26/342* (2015.10); *B22F 3/105* (2013.01); *B22F 3/24* (2013.01); *B23K 26/0648* (2013.01);
(Continued)

(58) Field of Classification Search
CPC .. H05B 1/0244; H05B 1/0227; H05B 1/0238; H05B 2203/003; H05B 2203/014;
(Continued)

(56) References Cited

U.S. PATENT DOCUMENTS 6,628,861 B1 * 9/2003 Yao ...................... G02B 6/2706
385/24
9,525,508 B2 * 12/2016 Segev ..................... H04J 14/04
(Continued)

FOREIGN PATENT DOCUMENTS

CN    101630045 A  *  1/2010
WO    2014118516 A1    8/2014

OTHER PUBLICATIONS

English translation of CN-101630045-A (Year: 2010).*
Written Opinion of International Application No. PCT/GB2019/000018 mailed May 22, 2019 (twelve (12) pages.

*Primary Examiner* — Chris Q Liu
(74) *Attorney, Agent, or Firm* — Iandiorio Teska & Coleman, LLP

(57) ABSTRACT

Apparatus for laser processing a material (11), comprising a laser (1), an optical fibre (2), and a coupler (125), wherein: the laser (1) is connected to the optical fibre (2); the optical fibre (2) is a multimode optical fibre having a first optical mode (21) having a first mode order (24), a second optical
(Continued)

mode (22) having a second mode order (25), and a third optical mode (23) having a third mode order (26); the third mode order (26) is higher than the second mode order (25) which is higher than the first mode order (24); the coupler (125) switches laser radiation propagating in the first optical mode (21) to laser radiation propagating in the second optical mode (22); and the coupler (125) switches the laser radiation propagating in the second optical mode (22) to laser radiation propagating in the third optical mode (23).

11 Claims, 12 Drawing Sheets

(51) Int. Cl.
| | | |
|---|---|---|
| B22F 3/24 | (2006.01) | |
| B23K 26/073 | (2006.01) | |
| B23K 26/34 | (2014.01) | |
| B23K 26/342 | (2014.01) | |
| B23K 26/38 | (2014.01) | |
| G02B 6/14 | (2006.01) | |
| G02B 6/26 | (2006.01) | |
| B33Y 10/00 | (2015.01) | |
| B33Y 30/00 | (2015.01) | |
| B33Y 40/20 | (2020.01) | |

(52) U.S. Cl.
 CPC .......... *B23K 26/0734* (2013.01); *B23K 26/34* (2013.01); *B23K 26/38* (2013.01); *G02B 6/14* (2013.01); *G02B 6/268* (2013.01); *B22F 2003/247* (2013.01); *B33Y 10/00* (2014.12); *B33Y 30/00* (2014.12); *B33Y 40/20* (2020.01)

(58) Field of Classification Search
 CPC ........ H05B 2203/017; H05B 2203/021; H05B 2203/035; H05B 2203/036; H05B 3/342; H05B 3/46; H05B 3/78
 USPC ....... 219/497, 202, 211, 217, 483, 484, 486, 219/501, 505, 508, 535, 536
 See application file for complete search history.

(56) References Cited

U.S. PATENT DOCUMENTS

| | | | |
|---|---|---|---|
| 9,528,875 B2 * | 12/2016 | Kuo | .......................... G01J 1/16 |
| 2008/0159692 A1 * | 7/2008 | Yao | ........................ G02B 6/276 |
| | | | 385/28 |
| 2011/0127697 A1 * | 6/2011 | Milne | ................ G02B 27/0938 |
| | | | 359/698 |
| 2015/0372444 A1 * | 12/2015 | Keen | ......................... H01S 3/10 |
| | | | 385/95 |
| 2018/0036943 A1 * | 2/2018 | Brown | .................. B29C 64/264 |

* cited by examiner

APPARATUS AND METHOD FOR LASER PROCESSING A MATERIAL

FIELD OF INVENTION

This invention relates to an apparatus and method for laser processing a material.

BACKGROUND TO THE INVENTION

Lasers are used in many laser processing applications including cutting, welding, drilling, engraving, and additive manufacturing. In these applications, it is often desirable to optimize the size and cross-sectional profile of the laser beam that is interacting with the material. For example, the spot size of the laser beam interacting with the material can be changed by changing the working distance between a focusing lens and a work piece. The cross-sectional profile can be changed from Gaussian to top hat, or to an annular or ring profile using external optics. However, providing external optics with such flexibility is expensive, and having to change the working distance takes time and therefore increases the costs of processing. It would be desirable to be able to change the laser beam from a single Gaussian fundamental mode to a top hat or annular beam without having to adjust optics in the processing head. It would also be desirable to be able to change the spot size of the laser beam without changing the working distance.

Metal powder-bed additive-manufacturing systems use a fundamental Gaussian mode in order to give the smallest possible feature size in three-dimensional structures being built. However, the use of the fundamental Gaussian mode means that it is slow to build larger structures. There is therefore a requirement to be able to switch the laser beam from a fundamental Gaussian mode that can create small features, to a laser beam having a larger and more uniform spot size that can process larger areas faster.

A problem that can occur with laser drilling is the laser beam damaging surfaces behind the hole once it has been drilled. The problem can be at least partially solved by providing annular laser beams. Annular beams can be created using axicon lenses, or by directing laser radiation into a cladding or a ring core of an optical fibre or other waveguide. However, such beams can diverge rapidly and do not preserve their annular cross-section beyond 1 mm to 2 mm away from focus. There is therefore a requirement to maintain an annular beam away from, and through, focus. There is a related requirement to reduce the hole size that can be drilled by providing an annular laser beam with low divergence.

Laser cutting of steel is achieved by directing a laser beam to a work-piece via a process head which has optics for collimating and focusing the laser beam and a conical copper nozzle for providing a high pressure gas jet which is co-axial with the laser beam. The basic cutting operation involves using the laser beam to heat and melt a required region in a work-piece, and using a gas jet, known as an assist gas jet, to blow the molten material out of the bottom of the cut-zone. The cutting head is moved over the work piece whilst maintaining a constant distance between a nozzle tip in the cutting head and the work-piece surface. The cutting head is moved in a programmed path to create the shape.

In the case of cutting stainless steel, the use an inert assist gas avoids the creation of metal oxides on the cut-edge faces of the work-piece. The metal oxides can cause problems such as weakening welded parts, reduction of the corrosive properties of the stainless steel owing to a depletion of chromium on the cut-edge faces, and increased wear on sliding parts owing to the increased hardness of the metal oxides compared to stainless steel. Since the only heat source for this cutting process is provided by the focused laser beam, a smaller focal spot size with a higher energy power density will provide more efficient cutting by generating a narrower molten region. Low divergence is required so that the melt region is narrow through the thickness of the metal. The limit on the smallest practical focused spot is determined by the optical depth of field in conjunction with the material thickness. This is because the cut-width (kerf) must be wide enough to allow the assist gas to travel to the bottom of the cut with sufficient pressure to cleanly remove molten material and avoid dross on the lower cut edge in order to generate a clean cut. For this type of cutting, the assist gas must be applied with high pressure, typically in the range of 10 to 20 bar. The diameter of the nozzle outlet is normally in the range 0.5 mm to 2.0 mm, and in general thicker materials require larger nozzles.

In the case of cutting mild steel (also known as low-carbon steel) thicker than 5 mm, it is typical to use oxygen as the assist gas. The oxygen exothermically reacts with the iron within the work-piece to provide additional heat which increases the cutting speed. The oxygen is applied at pressures typically in the range 0.25 bar to 1 bar. These pressures are much lower compared to those used for nitrogen assist gas cutting. For thick section cutting, typically in the range 10 mm to 30 mm thickness, the kerf must be wide enough so that the oxygen assist gas can reach the bottom of the cutting zone with sufficient gas flow to eject the molten material whilst maintaining a dross-free cut. It is typical for thick mild steel cutting for the beam to be defocussed such that the beam waist is above the sheet metal surface so that the incident beam diameter on the sheet metal surface is larger than the beam waist. Better quality cuts with lower edge roughness can be obtained when the divergence of the beam is increased.

Most general purpose flatbed laser cutting machines are required to cut a range of metals of varying thicknesses, with the cuts all being of good quality. The choice of focal spot size is typically a compromise of the requirements needed to meet the wide set of process conditions. For cutting thin stainless steel a small focal spot is needed with low divergence. For cutting thick mild steel a larger focal spot is needed with higher divergence. The flatbed cutting machines are designed to work with a laser having a fixed beam quality. In order to increase the processing capabilities, the cutting head may have an augmented optical system, firstly to enable limited movement of the focusing lens along the beam path to allow defocusing of the laser beam relative to the work-piece which can increase the incident spot size, and secondly to allow the focal spot diameter to be adjusted. This has limited benefit since a laser having constant laser beam quality will have a fixed relationship between the focal spot size and divergence, with this fixed relationship working in the opposite way to that desired by the cutting process regimes.

Different cutting regimes require either a small spot with low divergence or a large spot with high divergence whereas a laser having a fixed beam quality can either provide a small spot with high divergence, or a large spot with narrow divergence. It is therefore not possible to optimize process parameters for all metal types and thicknesses.

Fusion cutting is typically optimized by focusing a laser beam near a bottom surface of a material. High intensity of the laser beam is preferably for increasing cutting speed, but this can be at the expense of melt flow dynamics which can cause undesirable striations of the top surface of the cut. It would be desirable to provide a laser beam with an annular cross section at the top surface of the material, and a Gaussian or top-hat profile at the bottom surface. This would provide a better heat distribution on the top surface and a higher intensity to towards the bottom of the material, thus enhancing cut quality without significantly compromising cutting speed.

Similar limitations arise with other material processing equipment, such for example as welding, marking, and additive manufacturing. In all these application areas, there is a need for a laser processing apparatus in which the beam parameter product of the laser is able to be varied, and the diameter of the focused laser beam on the material being processed is able to be varied.

An aim of the present invention is to provide an apparatus and method for laser processing a material which reduces or avoids the aforementioned problems.

The Invention:

According to a non-limiting embodiment of the present invention, there is provided apparatus for laser processing a material, which apparatus comprises a laser, an optical fibre, and a coupler,
wherein:
  the laser is connected to the optical fibre;
  the optical fibre is such that laser radiation is able to propagate along the optical fibre in a first optical mode having a first mode order, a second optical mode having a second mode order, and a third optical mode having a third mode order;
  the third mode order is higher than the second mode order; and
  the second mode order is higher than the first mode order;
the apparatus being characterized in that:
  the coupler is configured to switch laser radiation propagating in the first optical mode to laser radiation propagating in the second order mode; and
  the coupler is configured to switch the laser radiation propagating in the second optical mode to laser radiation propagating in the third order mode.

The coupler may be configured to couple at least 75% of the laser radiation that can propagate in the first optical mode to the third optical mode.

The coupler may be configured to switch the laser radiation propagating in the first optical mode to a plurality of optical modes thus enabling a top-hat optical-power distribution of the laser radiation to be formed.

The apparatus may include an optical lens arrangement configured to focus the laser radiation onto or near a surface of the material.

The apparatus may include a lens, wherein the lens is defined by a front focal plane and a rear focal plane, the first optical mode is defined by a Rayleigh length, and the lens is located within two of the Rayleigh lengths from a distal end of the optical fibre from the laser.

The lens may be positioned such that the distal end of the optical fibre is located at the front focal plane.

The lens may comprise a graded index lens.

The optical fibre may have a plurality of cores, and the third optical mode and the first optical mode may propagate in different ones of the cores. At least one of the cores may be a ring core which surrounds another one of the cores.

The coupler may comprise at least one squeezing mechanism comprising a periodic surface defined by a pitch. The periodic surface may be located adjacent to the optical fibre. The squeezing mechanism may be configured to squeeze the periodic surface and the optical fibre together with a squeezing force, thereby coupling the first optical mode to the second optical mode, and coupling the second optical mode to the third optical mode.

The apparatus may be configured to apply different squeezing forces depending on a desired output mode.

The pitch may be a variable pitch which is chirped along the length of the periodic surface. The variable pitch may have a first pitch and a second pitch, wherein the first pitch couples the first optical mode and the second optical mode together, and the second pitch couples the second optical mode and the third optical mode together.

The squeezing mechanism may be configured to deform the optical fibre in a helical manner when the squeezing force is applied.

The laser radiation may be defined by a beam parameter product, and the coupler may be such that the beam parameter product is able to be increased by increasing the squeezing force.

The apparatus may include a long period grating configured to couple the third optical mode to a plurality of optical modes, thereby enabling the laser radiation to have a top hat or annular ring profile.

The long period grating may comprise a second squeezing mechanism comprising a periodic surface defined by a pitch; the periodic surface is located adjacent to the optical fibre; and the squeezing mechanism may be configured to squeeze the periodic surface and the optical fibre together with a squeezing force.

The apparatus may be configured to emit a single individual optical mode from the optical fibre.

The optical fibre may comprise a core that is substantially homogeneous, thereby avoiding unintentional mode coupling between the optical modes.

The present invention also provides a method for laser processing a material, which method comprises:
  providing a laser that emits laser radiation;
  providing an optical fibre through which the laser radiation is able to propagate in a first optical mode having a first mode order, a second optical mode having a second mode order, and a third optical mode having a third mode order; and
  coupling the laser radiation to the first optical mode of the optical fibre;
wherein
  the third mode order is higher than the second mode order; and
  the second mode order is higher than the first mode order;
the method being characterized by the following steps:
  providing a coupler that is configured to switch the laser radiation propagating in the first optical mode to laser radiation propagating in the second order mode, and to switch the laser radiation propagating in the second order mode to laser radiation propagating in the third order mode; and
  laser processing the material with the laser radiation.

At least 75% of the laser radiation propagating in the first optical mode may be switched to the third optical mode.

The laser radiation propagating in the first optical mode may be switched to a plurality of optical modes including the third optical mode thus forming a top-hat optical-power distribution of the laser radiation.

The first optical mode may be defined by a Rayleigh length, and the method may include the steps of: providing a lens that is defined by a front focal plane and a rear focal plane; and positioning the lens within two of the Rayleigh lengths from a distal end of the optical fibre from the laser.

The method may be such that the lens may comprise a graded index lens.

The method may include the step of focusing the laser radiation to form a beam waist on or near a surface of the material.

The method may be such that the first optical mode may be a fundamental mode of the optical fibre.

The method may be such that the third optical mode may have an azimuthal mode number of at least three, and a radial mode number of at least one.

The method may be such that the coupler may comprise at least one squeezing mechanism comprising a periodic surface defined by a pitch. The periodic surface may located adjacent to the optical fibre. The squeezing mechanism may be configured to squeeze the periodic surface and the optical fibre together with a squeezing force.

The method may include the step of providing a controller to apply a defined control signal to the squeezing mechanism in order to select a desired third optical mode. The step of selecting the third optical mode may be achieved by adjusting the squeezing force.

The method may include the step of providing a controller to apply a defined control signal to the coupler for selecting different optical output modes.

The method may include the step of selecting the first optical mode, and piercing the material with the laser radiation.

The step of laser processing the material comprises selecting the third optical mode, and cutting the material with the laser radiation.

The method may include the step of switching the laser radiation to a top-hat optical-power distribution, and cutting the material with the laser radiation.

The method may include the step of welding the material with the laser radiation.

The method may include the step of sintering the material with the laser, wherein the material prior to sintering is in the form of a metallic powder.

The method may include the step of drilling the material with the laser.

The present invention also provides a method of cutting a material using the apparatus of the invention, focusing the laser onto the material with a process head, selecting a Gaussian profile to pierce the material, and selecting a top-hat optical-power distribution to cut the material The present invention also provides a method of welding a material comprising using the apparatus of the invention, projecting the laser using a process head away from focus, and using the apparatus of the invention to vary a working spot size to optimize the weld process by variation of the spot size and profile.

The method of the invention may alternatively or additionally include a step or steps as required to utilize the above mentioned optional aspects of the apparatus of the invention.

BRIEF DESCRIPTION OF THE DRAWINGS

Embodiments of the invention will now be described solely by way of example and with reference to the accompanying drawings in which.

PREFERRED EMBODIMENT

Figure 1:
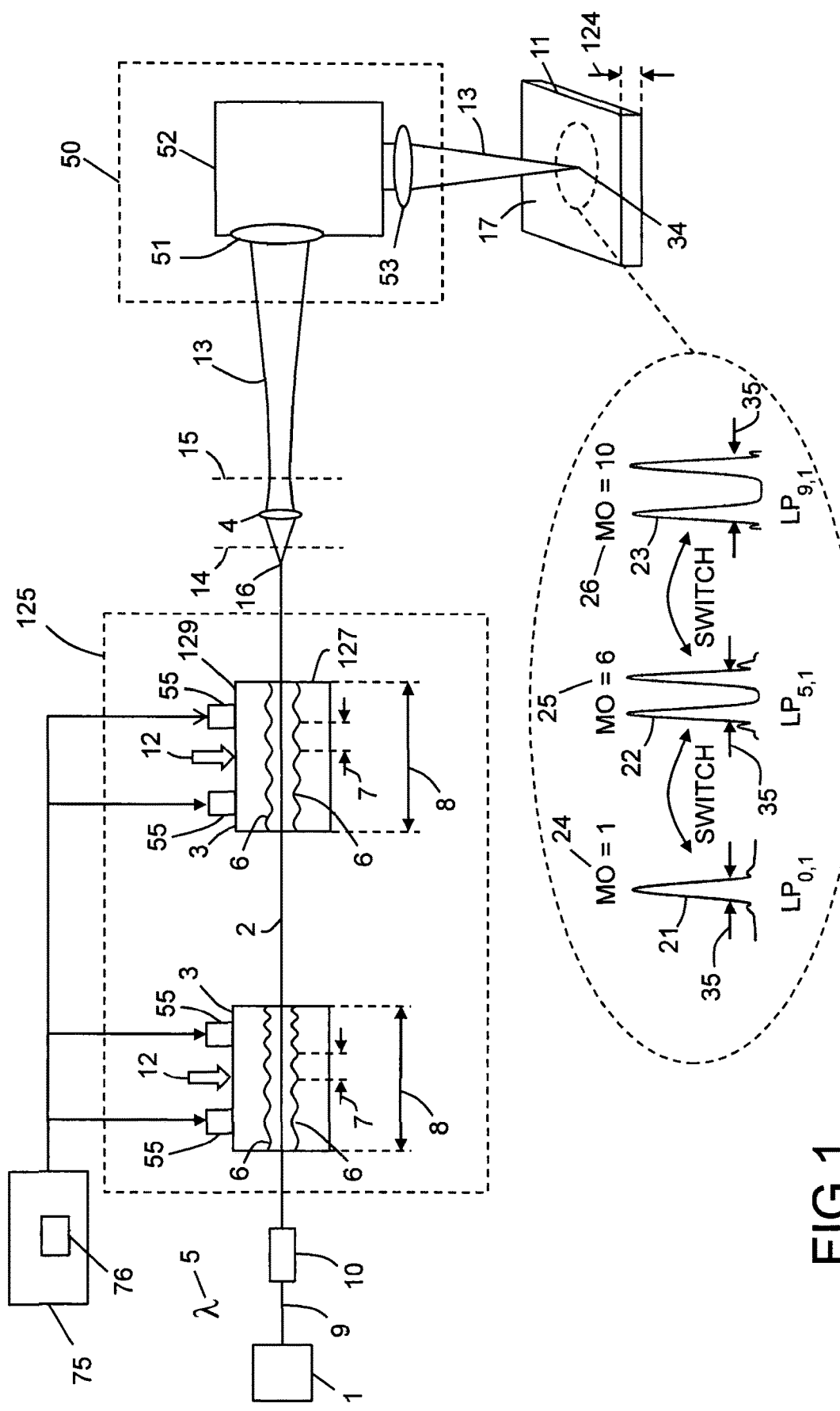
FIG. 1 shows apparatus for laser processing a material according to the present invention.

FIG. 1 shows apparatus for laser processing a material 11, which apparatus comprises a laser 1, an optical fibre 2, and a coupler 125, wherein:

the laser 1 is connected to the optical fibre 2;

the optical fibre 2 is such that laser radiation 13 is able to propagate along the optical fibre 2 in a first optical mode 21 having a first mode order 24, a second optical mode 22 having a second mode order 25, and a third optical mode 23 having a third mode order 26;

the third mode order 26 is higher than the second mode order 25; and the second mode order 25 is higher than the first mode order 24;

the apparatus being characterized in that:
the coupler 125 is configured to switch laser radiation propagating in the first optical mode 21 to the laser radiation propagating in the second optical mode 22; and
the coupler 125 is configured to switch the laser radiation propagating in the second optical mode 22 to laser radiation propagating in the third optical mode 23.

The coupler 125 may be configured to couple at least 75% of the laser radiation that can propagate in the first optical mode 21 to the third optical mode 23. The coupler 125 may be configured to couple at least 90% of the laser radiation that can propagate in the first optical mode 21 to the third optical mode 23.

The coupler 125 may comprise at least one squeezing mechanism 3. The squeezing mechanism 3 may comprise at least one periodic surface 6 defined by a pitch 7. The periodic surface 6 is located adjacent to the optical fibre 2. The pitch 7 is selected such that the periodic surface 6 couples the first optical mode 21 and the second optical mode 22 together. The squeezing mechanism 3 is configured to squeeze the periodic surface 6 and the optical fibre 2 together with a squeezing force 12, thereby coupling the first optical mode 21 to the second optical mode 22.

The apparatus of FIG. 1 may comprise a lens 4 that is defined by a front focal plane 14 and a rear focal plane 15. The first optical mode 21 can be defined by a Rayleigh length 217 shown with reference to FIG. 20. The lens 4 is located within two of the Rayleigh lengths 217 from the distal end 16 of the optical fibre 2. Preferably, the lens 4 is located within one of the Rayleigh lengths 217 from the distal end 16 of the optical fibre 2.

The lens 4 may be positioned such that the distal end 16 of the optical fibre 2 is located at the front focal plane 14.

At least one long period grating 127 can optionally follow the first squeezing mechanism 3. The long period grating 127 can have a pitch 7 that is uniform along its length 8, or can have a pitch 7 that is chirped along its length 8. The first squeezing mechanism 3 may be configured to couple the first optical mode 21 to the second optical mode 22. The long period grating 127 may be configured to couple the second optical mode 22 to the third optical mode 26. The long period grating 127 may be configured to couple the second optical mode 22 to a plurality of the third optical modes 26.

The first squeezing mechanism 3 may be configured to couple the first optical mode 21 to the third optical mode 26. The long period grating 127 may be configured to couple the third optical mode 22 to a plurality of optical modes (not shown). Preferably the long period grating 127 can be configured such that the optical modes are approximately uniformly excited, thus enabling the laser radiation 13 to have a top hat or an annular profile.

The long period grating 127 can comprise a fibre Bragg grating.

The long period grating 127 can comprise a second squeezing mechanism 129 such as shown in FIG. 1.

The laser 1 is connected to the optical fibre 2. The laser is shown as having an output fibre 9, which is connected to the optical fibre 2 at a splice 10. The laser 1 may be a laser that emits laser radiation in a fundamental mode from the optical fibre 9. The splice 10 may comprise a taper configured to launch a fundamental mode of the optical fibre 2. The splice 10 may be such that at least two modes of the optical fibre 2 are launched. Alternatively the laser 1 may be a laser that emits laser radiation in multiple transverse modes. The laser 1 can be a fibre laser, a disk laser, a rod laser, a slab laser, or a solid state laser. The apparatus may be sold with or without the laser 1.

The optical fibre 2 may be positioned in any place in the apparatus that is suitable. Thus, for example, the optical fibre 2 may comprise one or more optical fibres that are spliced together. It can be advantageous to co-locate the first squeezing mechanism 3 with the laser 1 so that control signals that control the laser can also be used to control the first squeezing mechanism 3. This avoids expensive cabling and control systems. The first squeezing mechanism 3 can be packaged with the laser 1, or can be located outside the packaging of the laser in a transport fibre that transmits the laser radiation 13 from the laser 1 to the distal end 16 of the optical fibre 2.

Figure 2:
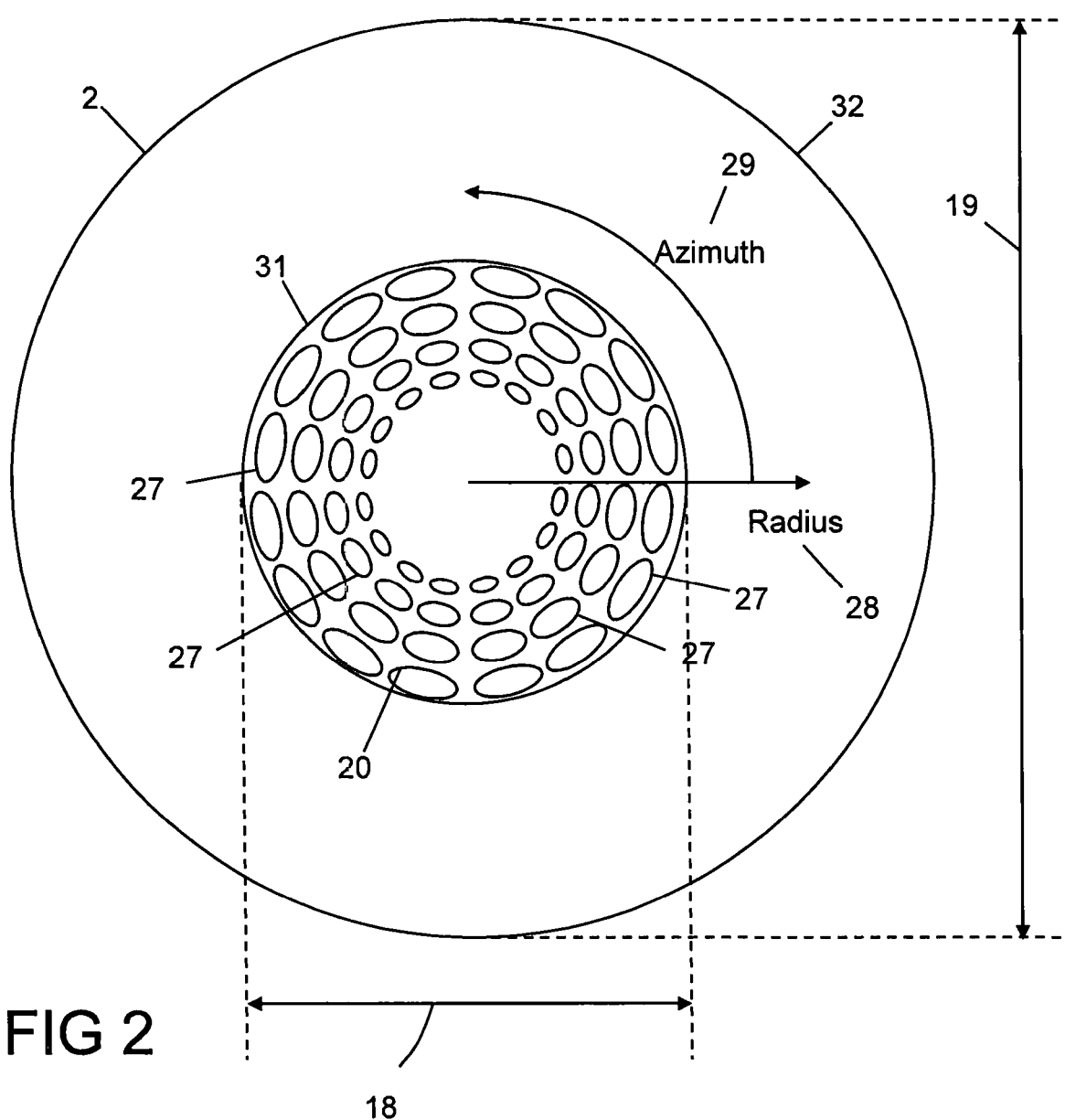
FIG. 2 shows the intensity distribution of a guided mode of an optical fibre.

The optical fibre 2 comprises a core 31 and a cladding 32 as shown in FIG. 2. The core 31 is defined by a core diameter 18 and a glass cladding diameter 19. The core diameter 18 may be between 20 µm and 150 µm, preferably between 50 µm and 105 µm, and more preferably 50 µm. The glass cladding diameter 19 may be between 150 µm to 500 µm, and preferably between 150 µm and 250 µm. Preferably the ratio of the glass cladding diameter 19 to the core diameter 18 is at least 5, and more preferably at least 10 in order to avoid microbending and uncontrolled coupling between the modes.

Figure 28:
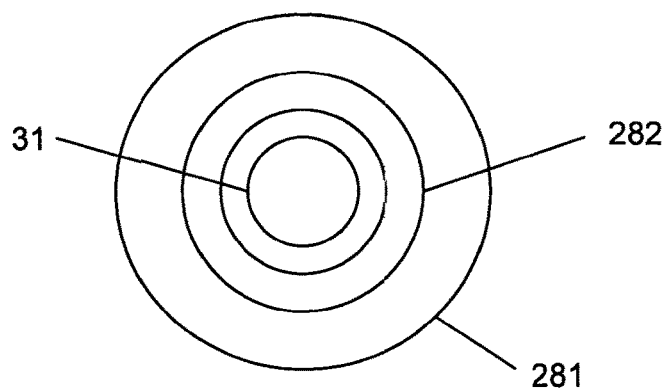
FIG. 28 shows an optical fibre having a ring core.

The optical fibre 2 can be the optical fibre 281 shown in FIG. 28. The optical fibre 281 has a ring core 282 surrounding the core 31. The ring core 282 may be designed such that it supports the third optical mode 23 which was described with reference to FIG. 1.

Referring again to FIG. 2, the optical fibre 2 is shown guiding an optical mode 20. The optical mode 20 comprises a number of lobes 27 where the intensity of the optical mode 20 has a local maximum. There are sixteen lobes 27 around the azimuth 29 of the fibre 2, and four lobes 27 along its radius 28. Following normal convention, the optical mode 20 is an $LP_{p,q}$, mode, where p is the azimuthal mode number, and q is the radial mode number. The number of lobes 27 around the azimuth 29 is equal to two times the azimuthal mode number, and the number of lobes 27 along the radius 28 is equal to the radial mode number q. The mode 20 shown is the $LP_{8,4}$ mode, as there are sixteen lobes 27 around the azimuth 29, and four lobes 27 along the radius 28. The mode order of the optical mode 20 is given by:

Mode Order=$p+2q-1$

In this example, the optical mode 20 has a mode order=15.

Figure 3:
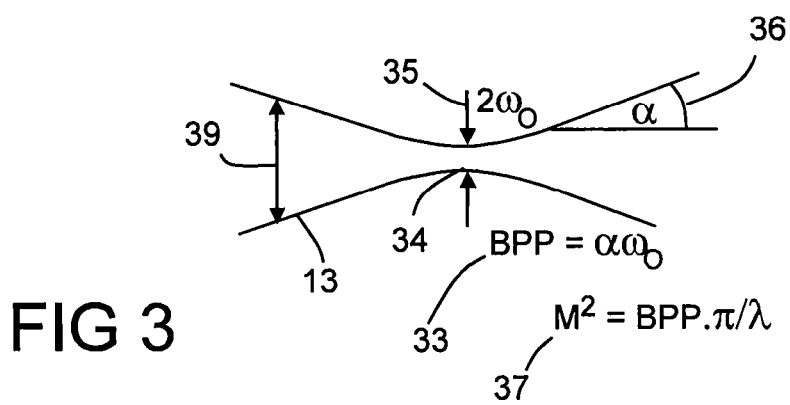
FIG. 3 shows a beam waist formed by a laser beam.

FIG. 3 shows the laser radiation 13 having a beam diameter 39 that varies with distance is brought to a focus 34. The laser radiation 13 has a beam waist diameter 35 equal to $2\omega_0$ at the focus 34. The beam waist diameter 35 is often referred to as the spot size. The laser radiation 13 diverges away from the focus 34 with a divergence angle 36 equal to a. The product of half the beam waist diameter 35 and the divergence angle 36 is defined as the beam parameter product BPP 33:

BPP=$\alpha \cdot \omega_0$

The beam parameter product 33 is a measure of the beam quality of laser radiation 13. The beam parameter product 33 is related to the beam quality $M^2$ value 37 and λ, the wavelength 5 of the laser radiation 13, by the following equation:

BPP=$M^2 \cdot \lambda/\pi$

Diffraction limited Gaussian modes have a beam quality $M^2$ value 37 that is equal to their mode order. If the modes have the same beam waist diameter 35, then the divergence angle 36 is proportional to their mode order number. The beam waist diameter 35 is often referred to as spot size.

The optical modes guided by optical fibres are typically not perfect diffraction limited Gaussian modes. For example, a single mode optical fibre has an $M^2$ value 37 of approximately 1.1. However to a first approximation, the optical modes have an $M^2$ value 37 equal to the mode order. Also to a first order approximation, the optical modes propagating along the optical fibre 2 have a beam waist diameter 35 that is approximately equal to the core diameter 18 shown with reference to FIG. 2. Thus if the laser radiation 13 propagates along the optical fibre 2 as an ensemble of optical modes having different azimuthal mode numbers p and different radial mode numbers q, then the divergence angles 36 of the laser radiation 13 in each of the optical modes will be given by:

$$\alpha = M^2 \cdot \lambda / (\pi \cdot \omega_0)$$

which is approximately:

$$\alpha = (p + 2q - 1) \cdot \lambda / (\pi \cdot \omega_0)$$

where the beam waist diameter 35 $2\omega$ is approximately the core diameter 18 of the optical fibre 2.

Thus to a first order, the laser radiation 13 emerging from the distal end 14 of the optical fibre 2 will emerge as groups of optical modes, each having the same beam waist diameter 35, and with a variation of divergence angles 36 such that the divergence angles 36 increase with the mode order of the optical modes.

Accounting for diffraction as well as the refraction of the lens 4, a lens 4 which is placed such that the distal end 16 of the optical fibre 2 is at its front focal plane 14, will produce a waist at its rear focal plane 15 where the optical field is a magnified spatial Fourier transform of the field of the laser radiation 13 propagating along the optical fibre 2. In other words, referring to FIG. 1, the lens 4 converts incident angles to displacement in the rear focal plane 15. Thus an ensemble of modes having approximately the same beam waist diameter 35 at the distal end 16 of the optical fibre 2, and diverging with different divergence angles 36 away from the front focal plane 14, will be transformed into an ensemble of modes having different beam waist diameters 35 in the rear focal plane, and substantially the same divergence angle 36 away from the rear focal plane 15.

The magnification at the rear focal plane 15 is given by the ratio of the focal length of the lens 4 to the Rayleigh length of the field at the distal end 16 of the optical fibre 2. The Rayleigh length is defined as the distance from the distal end 16 of the optical fibre 2 to the plane where the radius of the beam has increased by a factor of the square root of two. For example, if the focal length of the lens 4 is equal to the Rayleigh length, the radius of the beam at the rear focal plane 15 will be equal to the radius of the beam at the distal end 16 of the optical fibre 2. If the focal length of the lens 4 is twice the Rayleigh length, the width of the beam waist at the rear focal plane 15 will be twice the width at the distal end 16 of the optical fibre 2, and the divergence 36 of the beam will be half the divergence of the beam emerging from the distal end 16 of the optical fibre 2.

Figure 4:
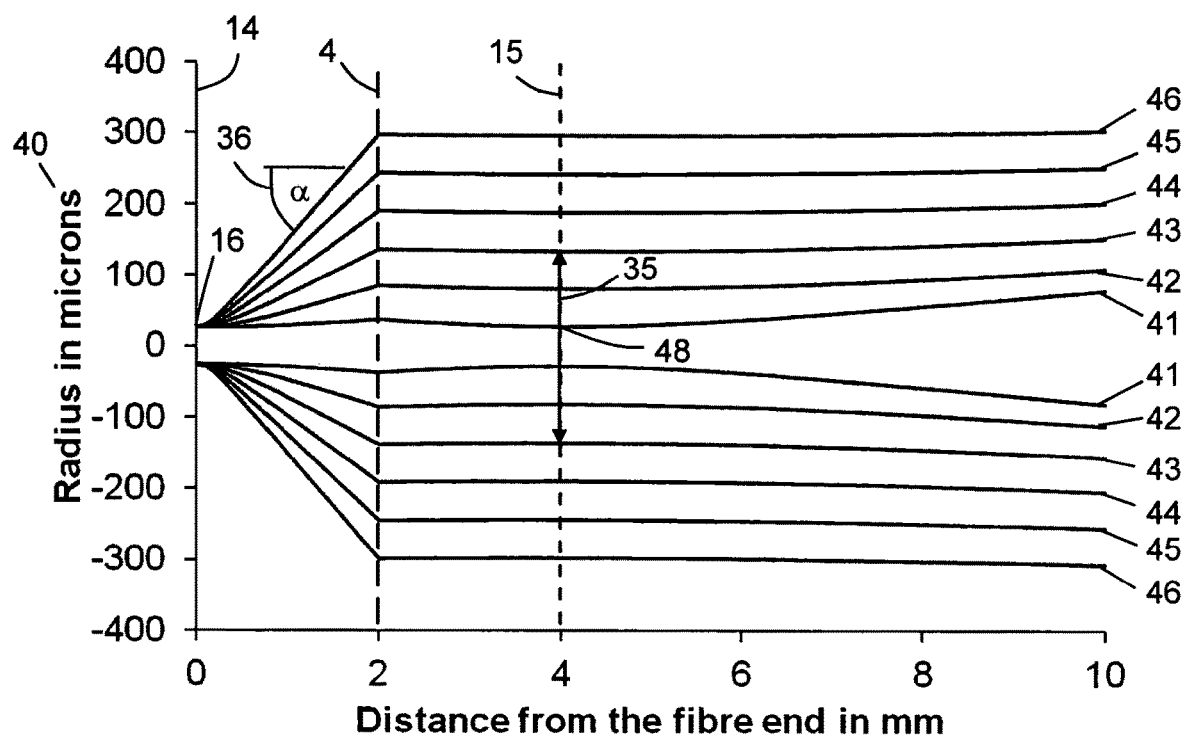
FIGS. 4 and 5 show the beam diameters of optical modes diverging from a distal end of the optical fibre, and being imaged by the lens.
Figure 5:
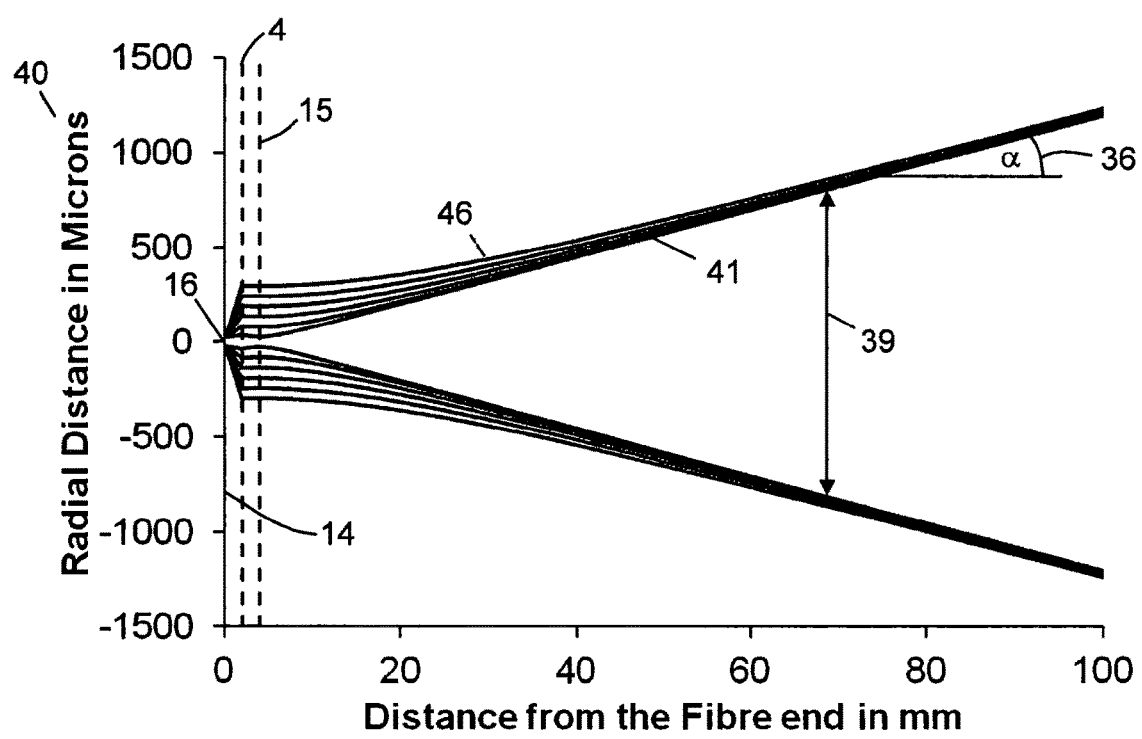
Figure 15:
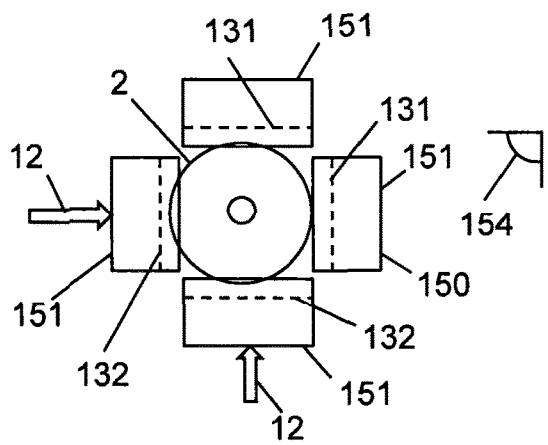
FIG. 15 shows a squeezing mechanism comprising four periodic surfaces, with each periodic surface arranged at right angles to its neighbours.

FIGS. 4 and 5 show how the beam diameters 39 vary with distance 49 from the distal end 16 of the optical fibre 2 for the $LP_{0,1}$ mode 41, the $LP_{2,1}$ mode 42, the $LP_{4,1}$ mode 43, the $LP_{6,1}$ mode 44, the $LP_{8,1}$ mode 45, and the $LP_{10,1}$ mode 46. The beam diameters 39 are shown as the difference in the radial distances 40 between the higher and lower lines for each mode, as indicated in FIG. 4 by the beam diameter 39 of the $LP_{4,1}$ mode 43 at a distance of 4 mm from the distal end 16 of the fibre 2. Some of the numbers of the optical modes 41 to 46 have been omitted in FIG. 5 for clarity. The optical fibre 2 has a core diameter 18 of 50 µm. The beam diameters 39 of the optical modes 41 to 46 are assumed to have a beam waist diameter 35 equal to the core diameter 18, that is a beam waist diameter 35 of 50 µm at the distal end 16 of the optical fibre 2. The modes 41 to 46 diverge from the distal end 16 with different divergence angles 36 because the modes 41 to 46 have different mode order numbers, and therefore different beam diameter products 33. The lens 4 is positioned such that the distal end 16 of the optical fibre 2 is at the front focal plane 14 of the lens 4. The lens 4 converts angles that are incident on the lens 4 to distances from its optical axis in the rear focal plane 15. The modes 41 to 46 each form a beam waist 48 at the rear focal plane 15 where they each have different mode field diameters 35 from each other. As shown in FIG. 15, as the modes 41 to 46 diffract away from the rear focal plane 15, they converge to have the same divergence angle 36.

Referring again to FIG. 1, the apparatus comprises an optical lens arrangement 50 configured to image the rear focal plane 15 of the lens 4 onto or near a surface of the material 11. The optical lens arrangement 50 is shown as comprising a collimating lens 51, a laser light scanner 52, and a focusing lens 53. Other optical lens arrangements 50 are also possible. The optical modes 41 to 46 described with reference to FIGS. 4 and 5 have the same divergence angles 36 away from the rear focal plane 15. The modes 41 to 46 have different mode order numbers, and therefore different beam quality $M^2$ values 37 and different beam parameter products 33. The modes 41 to 46 will therefore have different beam waist diameters 35 at the focus 34. Neglecting the effects of optical imperfections such as aberration, the beam waist diameters 35 at the focus 34 on the surface of the material 11 will be equal to the magnification of the optical lens arrangement 50 and the beam waist diameters 35 of the respective modes at the rear focal plane 15.

Thus the lens 4 has converted the near field of the laser radiation 13 at the front focal plane 14 to the far field of the laser radiation 13 at the rear focal plane 15. The image of the rear focal plane 15 on the surface of the material 11 will therefore also be the far field of the laser radiation 13. The ability to image the far field of the laser radiation 13 provides some important advantages over imaging the near field of the laser radiation 13. These include faster piercing speeds, faster cutting speeds, and better edge qualities when cutting certain materials. In addition, the requirement to adjust the relative position of the material 11 and the focusing lens 53 can often be avoided, which provides substantial cost advantages.

Figure 6:
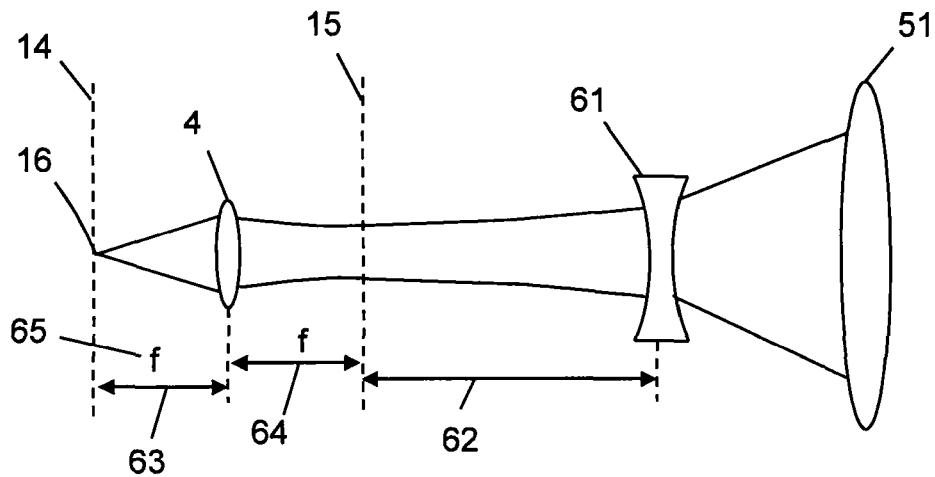
FIG. 6 shows a negative lens being used to increase the divergence of the laser beam.

Referring to FIG. 4, the lens 4 has reduced the divergence angle 36 of the laser radiation 13 being emitted from the optical fibre 2. The divergence angle 36 can be increased with a negative lens 61 as shown in FIG. 6. The negative lens 61 is placed such that the rear focal plane 15 is between the lens 4 and the negative lens 61. Making a thin lens approximation, the distance 63 between the front focal plane 14 and the lens 4 is the focal length 65 of the lens 4. The distance 64 between the rear focal plane 15 and the lens 4 is also the focal length 65 of the lens 4.

Figure 10:
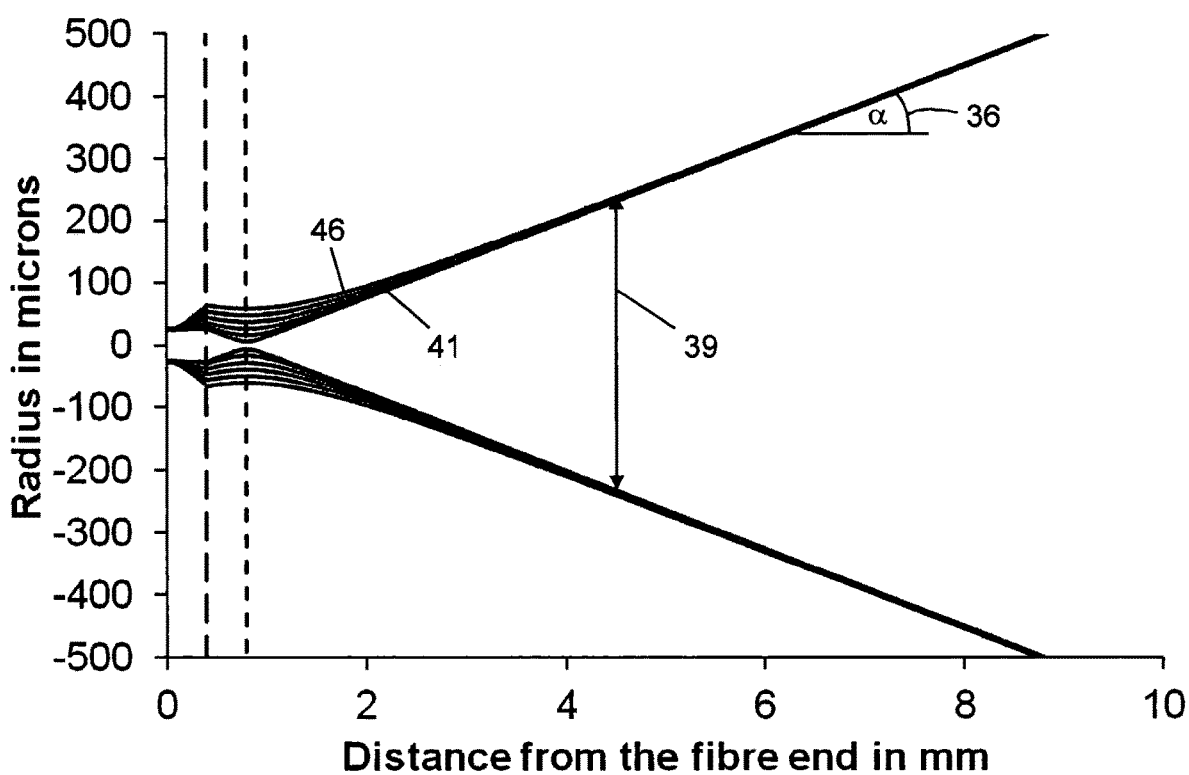
FIG. 10 shows the beam diameters of optical modes being imaged by a short focal length lens.

Referring again to FIG. 1, the magnification of the lens 4 is given by the ratio of the focal length of the lens 4 to the Rayleigh length of the laser radiation 13 emerging from the distal end 16 of the optical fibre 2. In order to increase the divergence angle 36, the magnification should be as small as possible. This implies that the focal length 65 of the lens 4 should be as short as possible, ideally no more than four times the Rayleigh length of the beam from the optical fibre 2. This is because the aim is generally to image the field at the back focal plane 15 of the lens 4 to a small focal size 34 on the material 11 with a focusing lens 53 that has a reasonably large focal length in order to protect the focusing lens 53 from spatter from the work piece. If the field that is to be imaged onto the target is too large and the divergence angle 36 too low, the system of imaging optics may become inconveniently large. Therefore, there is a practical limit to the magnification of the lens 4. FIG. 10 shows how the beam diameters 39 vary with distance 49 from the distal end 16 of the optical fibre 2 for the $LP_{0,1}$ mode 41, the $LP_{2,1}$ mode 42, the $LP_{4,1}$ mode 43, the $LP_{6,1}$ mode 44, the $LP_{8,1}$ mode 45, and the $LP_{10,1}$ mode 46 when the lens 4 has a focal length of 400 μm. The divergence is more rapid than the divergence of FIG. 5.

Figure 7:
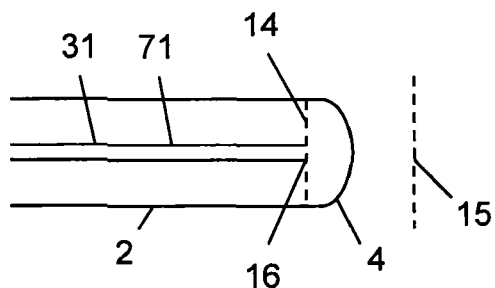
FIG. 7 shows a short focal length lens formed on the distal end of the optical fibre.

A shorter focal length 65 can be achieved by forming the lens 4 on the output of the optical fibre 2 as shown in FIG. 7. The lens 4 can be formed by melting the glass of the optical fibre 2, for example using an electric arc, a flame, or a laser. Dopants 71 that define the core 31 will diffuse as the lens 4 is formed. The distal end 16 of the optical fibre 2 is where the guidance provided by the core 31 ends. The lens 4 is such that the distal end 16 is located at the front focal plane 14.

Figure 8:
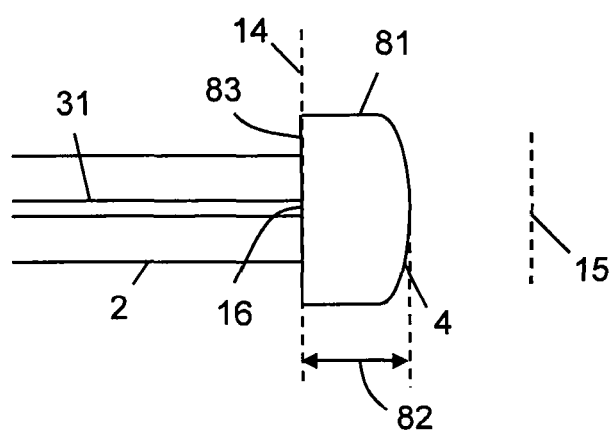
FIG. 8 shows a short focal length lens formed on an end cap joined to the distal end of the optical fibre.

The lens 4 can be formed on an end cap 81 which is connected to the optical fibre 2 as shown in FIG. 8. The end cap 81 can be shaped with a carbon dioxide laser, or by diamond turning. End caps are often spliced onto the ends of fibres used to deliver high power laser beams in order to prevent optical damage at the glass to air surface. The lens 4 and the length 82 of the end cap 81 are such that the front focal plane 14 in the glass material of the end cap 81 is at the front surface 83 of the end cap 81. The end cap 81 is preferably made of silica.

An end cap is preferably fitted to the optical fibre 2 shown in FIG. 1. A silica end cap has a refractive index of approximately 1.5, and so the lens 4 has to be moved closer to the optical fibre 2 to compensate in order to ensure that the distal end 16 is at the front focal plane 14 of the lens 4.

Figure 9:
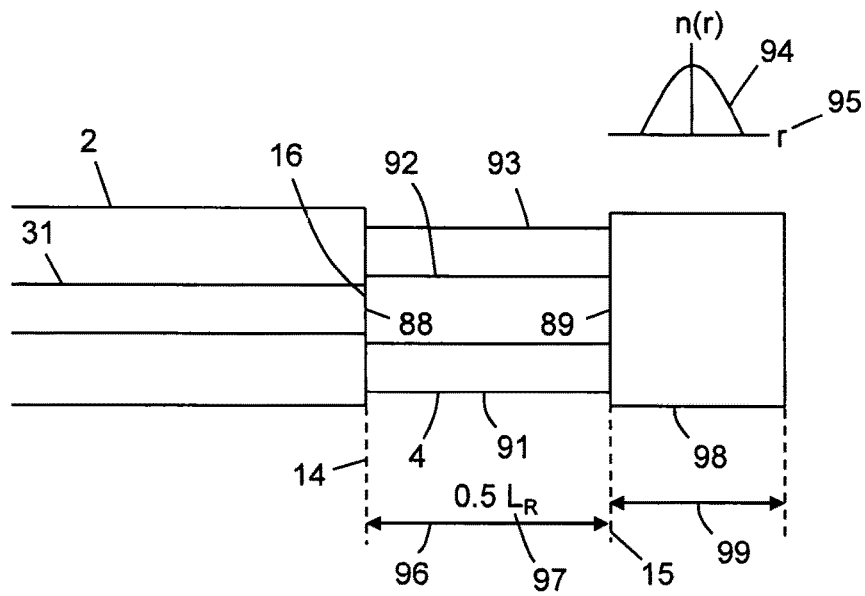
FIG. 9 shows a short focal length lens made with a graded index optical fibre.

FIG. 9 shows the lens 4 that has been made from a graded index optical fibre 91 having a core 92 and a cladding 93. The core 92 has a refractive index profile 94 that varies with radius 95. The refractive index profile 94 is preferably a parabolic profile. Such fibres refocus an image on their front face after a refocusing length $L_R$ 97, where the refocused image is inverted. The refocusing length $L_R$ 97 is half the pitch length over which an image at the beginning of the pitch is reformed. The length 96 of the graded index optical fibre 91 is preferably equal to a half of the refocusing length 97, or an odd integral number of half of the refocusing lengths 97. That is the length 96 can be 0.5 $L_R$, 1.5 $L_R$, 2.5 $L_R$, 3.5 $L_R$, etc. The front focal plane 14 is then at the front face 88 of the graded index optical fibre 91, and the rear focal plane 15 is at the rear face 89 of the graded index optical fibre 91. Preferably, an end cap 98 is joined to the graded index optical fibre 91 in order to prevent optical damage caused by high power laser beams. The end cap 98 is preferably fused silica. The length 99 of the end cap 98 can be between 1 mm to 5 mm.

The apparatus shown in FIG. 9 was made using a graded index fibre having a length 96 of approximately 0.4 mm. The modes 41 to 46 diffracted more quickly than the diffraction shown in FIGS. 5 and 10. The greater divergence 36 of the laser beam 13 means that, referring again to FIG. 6, the negative lens 61 was no longer required to make the beam compatible with a reasonably sized system of imaging lenses.

Figure 11:
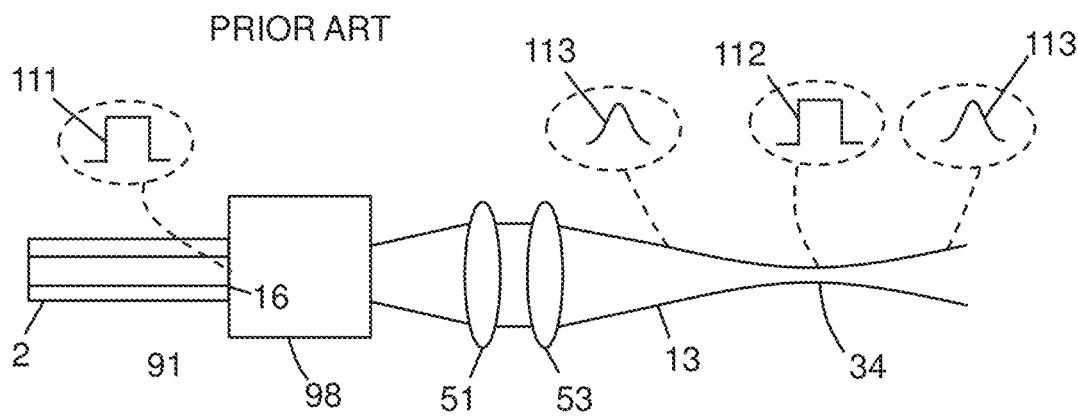
FIG. 11 shows a top hat power distribution at the distal end of the optical fibre being imaged by an apparatus according to the present invention to a top hat power distribution at a focus of the laser beam.

FIG. 11 shows a prior art apparatus for laser processing a material with the laser radiation 13. The apparatus of FIG. 11 does not include the lens 4. The collimation lens 51 and focusing lens 53 image the near field profile 111 of the laser radiation 13 at the distal end 16 of the optical fibre 2 to form the intensity profile 112 at the focus 34. The intensity profile 112 is an image of the near field profile 111. Thus if the near field profile 111 is a top hat distribution as shown, then the near field profile 112 is also a top hat distribution. Either side of the focus 34, there is a far field distribution 113, which will look more Gaussian. A top hat distribution at the focus 34 can be advantageous in certain applications such as cutting and welding. However it is often preferred in cutting applications to have a sharper field distribution at the focus 34 in order to pierce the material.

In cutting of bright metals, a common procedure is to pierce the material 11 using a focused, high intensity laser beam, and, once piercing has been achieved, to move out of focus and use a broader spot size for the cutting of the material 11. A laser beam profile with a high peak intensity at the centre is desirable to minimize the speed of piercing the material 11. For cutting, a more uniform-top hat profile is desirable to achieve a clean cut. A well homogenized laser beam containing many optical modes that propagate along a multimode fiber will have a top-hat profile in the near field and a more pointed profile in the far field. Therefore the ability to focus the far-field profile of the laser radiation 13 emitted from the distal end 16 of the optical fiber 2 onto the material 11, and approach the near field profile far from focus, produces a laser beam which has far more desirable characteristics for this process.

A top hat distribution can be obtained in the apparatus of FIG. 1 by applying the squeezing force 12 to squeeze the optical fibre 2. As will be explained below, if the squeezing force is relatively gentle, the individual modes are coupled together. If the squeezing force 12 is increased, then more and more modes couple together, and it is possible to obtain a top hat distribution.

Figure 12:
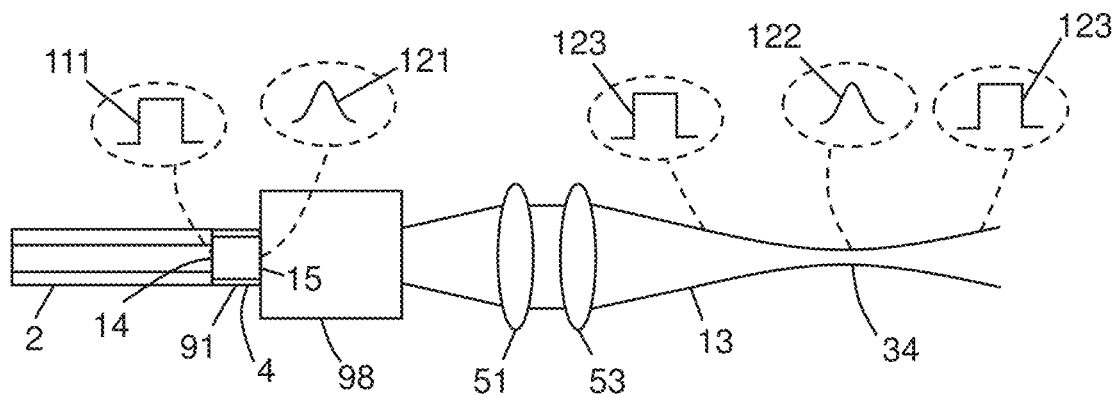
FIG. 12 shows a top hat power near-field distribution at the distal end of the optical fibre being imaged by an apparatus according to the present invention to a far field of the top hat distribution at the focus of the laser beam.

FIG. 12 shows the apparatus of FIG. 11, but with the lens 4 in place. The lens 4 is implemented as the graded index fibre 91. Other forms of the lens 4 are also possible, including the lenses described with reference to FIGS. 1, 6, 7 and 8. The near field profile 111 has been converted to a far field profile 121 at the rear focal plane 15 of the lens 4. The collimating lens 51 and the focusing lens 53 image the far field profile 121 to form the far field profile 122 at the focus 34. There is a near field profile 123 either side of the focus 34. If the near field profile 111 is a top hat distribution, the far field profile 122 is more Gaussian, and is thus more useful for piercing materials during cutting applications. Once pierced, the near field profile 123 can be used to cut the material. Referring to FIG. 1, the material 11 may have a thickness 124. The thickness 124 may be between 1 mm to 25 mm, or larger. Arranging for the focus 34 to be within the material 11 facilitates piercing the material 11. Once pierced, the material 11 can be cut using the far field profile 123 which is projected onto a surface 17 of the material 11.

Figure 13:
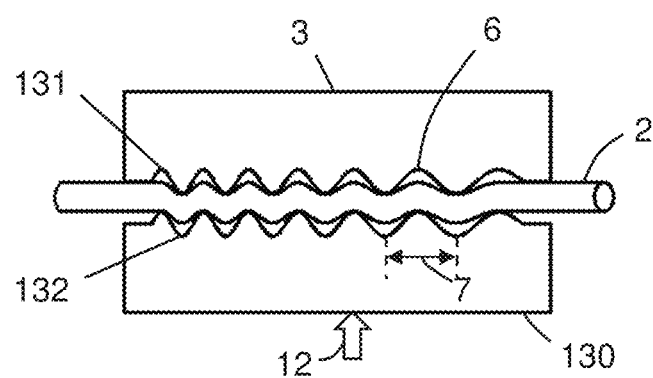
FIG. 13 shows a squeezing mechanism in which the optical fibre is bent periodically along its length.

Referring again to FIG. 1, the squeezing mechanism 3 may be the squeezing mechanism 130 shown in FIG. 13. The squeezing mechanism 130 comprises a first periodic surface 131 and a second periodic surface 132 that are arranged out of phase, such that the optical fibre 2 is bent periodically along its length with the pitch 7. The pitch 7 can be uniform, or chirped as shown. The chirp can be monotonic or non-monotonic.

The squeezing mechanism 3 may be the squeezing mechanism 140 shown in FIG. 13. The first periodic surface 131 and the second periodic surface 132 are arranged in-phase with each other such that they squeeze the optical fibre 2 periodically with the pitch 7 without substantially bending the optical fibre 2. The optical fibre 2 has a squeezing pressure that varies periodically with the pitch 7 along its length. The pitch 7 can be uniform, or chirped as shown. The chirp can be monotonic or non-monotonic.

FIG. 15 shows a squeezing mechanism 150 comprising four parts 151 that are arranged at an angle 154 to each other. The first and the second periodic surfaces 131, 132 may be out of phase with each other, in which case the optical fibre 2 is bent periodically along its length. The optical fibre 2 can be deformed into a helix if the relative phases of the first periodic surfaces 131 of the orthogonal parts 151 are out of phase with each other. Alternatively, the first and the second periodic surfaces 131, 132 of each of the parts 151 may be in phase with each other, in which case the optical fibre 2 is pressurized periodically along its length.

Figure 16:
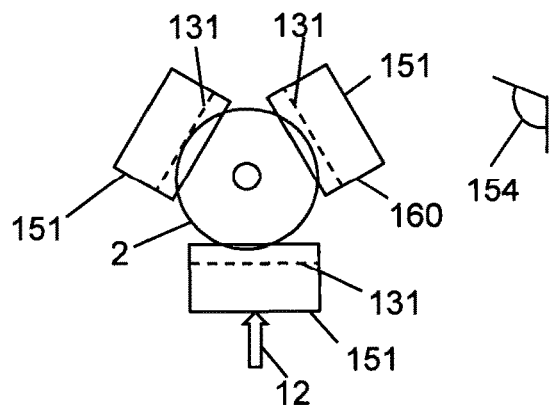
FIG. 16 shows a squeezing mechanism comprising three periodic surfaces arranged at 60 degrees to each other.

FIG. 16 shows a squeezing mechanism 160 having three of the parts 151 arranged at 120 degrees with respect to each other. Each of the mechanisms 150 has the first periodic surface 131. The first periodic surfaces 131 may be arranged to be spatially 120 degrees out of phase with each other, along their length, in which case the optical fibre 2 is distorted into a helix. Alternatively the first periodic surfaces 131 may be arranged to be in phase with each other along their length, in which case the optical fibre 2 is pressurized periodically along its length.

Figure 17:
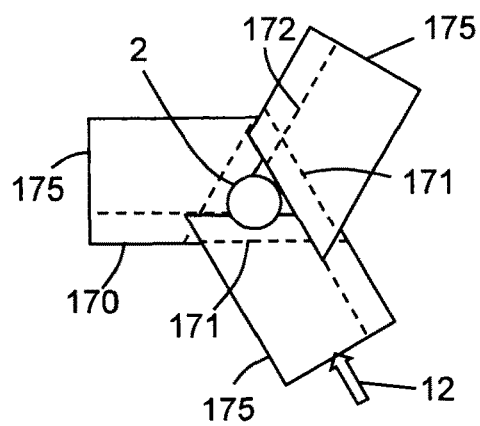
FIG. 17 shows a squeezing mechanism containing three parts for distorting the optical fibre into a helix.
Figure 18:
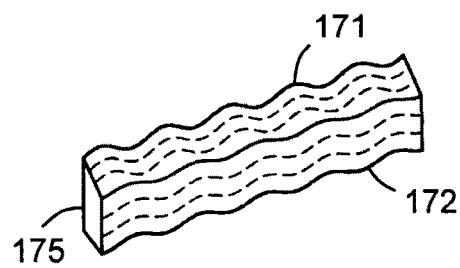
FIG. 18 shows a detail of one of the three parts.

FIG. 17 shows a squeezing mechanism 170 comprising three parts 175 that each have two periodic surfaces 171 and 172 shown with reference to FIG. 18. The parts 175 are arranged at 120 degrees with respect to each other. The periodic surfaces 171 and 172 are spatially 120 degrees out of phase with each other along their length, and thus the optical fibre 2 is deformed in a substantially helical manner.

Referring to FIG. 1, the first optical mode 21 has an effective index of $\beta_1/k$ and the second optical mode 22 has an effective index of $\beta_2/k$, where $\beta_1$ and $\beta_2$ are the propagation constants of the first optical mode 21 and the second optical mode 22 respectively, and k is the wavenumber which is related to the wavelength $\lambda$ 5 of the laser radiation 13 by $k=2\pi/\lambda$. It is useful to consider the difference in the propagation constants $\Delta\beta = \beta_1 - \beta_2$. In order for the squeezing mechanism 3 shown with reference to FIG. 1 to couple the first optical mode 21 to the second optical mode 22, it is required that there is a spatial frequency component in the distortion of the optical fibre 2 along its length that is equal to $\Delta\beta/2\pi$. This will occur if the periodicity (defined as the reciprocal of the pitch 7) is equal to $\Delta\beta/2\pi$, or a harmonic of the periodicity is equal to $\Delta\beta/2\pi$. However it is also important to consider the symmetry of the perturbation of the optical fibre 2 compared to the optical modes.

If p is non-zero, then the azimuthal dependence of the electric fields for each $LP_{p,q}$ mode guided by a core of the optical fibre 2 can be expressed by the following:

$$E(r,\theta) = E(r) \cdot \cos(p\theta)$$

$$E(r,\theta) = E(r) \cdot \sin(p\theta)$$

where E(r) is the radial dependence of the electric field.

Figure 14:
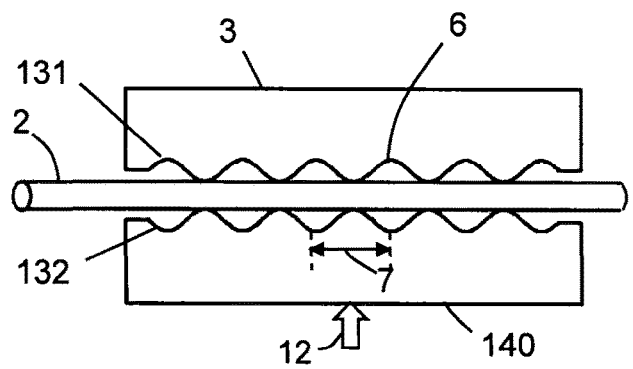
FIG. 14 shows a squeezing mechanism in which the optical fibre is compressed periodically along its length.

When the optical fibre 2 has a linear sinusoidal deflection along its length, as described with reference to FIG. 13, then by symmetry considerations, only one of the $\cos(p\theta)$ and $\sin(p\theta)$ orientations will be coupled when the pitch 7 equals $2\pi/\Delta\beta$. More generally, the $LP_{01}$ mode guided by the core 31 can couple to a $LP_{p,q}$ mode guided by the same core if p is an odd integer if the pitch 7 is equal to $2\pi/(\beta_A - \beta_B)$, where $\beta_A$ and $\beta_B$ are the propagation constants of the optical modes being coupled together. However the coupling to the $LP_{11}$ mode will be the strongest unless there are significant harmonics in the sinusoidal deflection. If p is an even integer, then the symmetry of the perturbation is incorrect. By a similar symmetry argument, the linear squeezing mechanism also will not couple the $LP_{01}$ mode to a $LP_{0q}$ mode if the fibre has a sinusoidal deflection along its length. If the periodic surface 6 is compressed periodically along its length, as described with reference to FIG. 14, then mode coupling will be induced by a photoelastic effect. By symmetry considerations, the $LP_{01}$ mode will not couple to the $LP_{11}$ mode because the symmetry is incorrect. However the $LP_{01}$ mode is able to couple to the $LP_{21}$ mode, or more generally to $LP_{p,q}$ modes where p=2, 4, 8 etc if the pitch 7 is equal to $2\pi/(\beta_A - \beta_B)$, where $\beta_A$ and $\beta_B$ are propagation constants of the optical modes being coupled together.

When the optical fibre 2 has a helical distortion, as described with reference to FIGS. 15 to 18, then by symmetry arguments the $LP_{01}$ mode can couple to the $LP_{p,q}$ modes in both the $\cos(p\theta)$ and $\sin(p\theta)$ orientations when the pitch 7 equals $2\pi/\Delta\beta$ and p is an odd integer. However it will not couple if p is an even integer, or to a $LP_{0q}$ mode. There is thus at least twice the amount of mode coupling provided by the squeezing mechanisms shown in FIGS. 15 to 18 than for the linear squeezing mechanism shown in FIG. 13.

The helical squeezing mechanisms described with reference to FIGS. 15 to 18, in which the optical fibre 2 is perturbed in a helical manner, are therefore advantageous in that they couple more orientations of the modes together than the linear squeezing mechanism shown with reference to FIG. 13. Moreover, the squeezing force 12, and hence the maximum deflection of the optical fibre 2, required to provide the coupling is less, which results in less stress being applied to the optical fibre 2, and thus higher reliability. Experimentally, it has been observed that the optical fibre 2 can be pulled from helical squeezing mechanisms such as shown in FIG. 17 with a pulling force less than 1 Newton (N). This is substantially less than the pulling force required to pull the optical fibre 2 from linear squeezing mechanisms such as shown in FIG. 13 where the helical and the linear squeezing mechanisms induce similar levels of mode coupling in the optical fibre 2. Less squeezing forces 12 are therefore being applied to the optical fibre 2 in the helical squeezing mechanism, implying greater mechanical reliability.

The core 31 preferably has a uniform refractive index profile without refractive index ripples across its radius. The optical fibre 2 is preferably either a step-index fibre, or an optical fibre having a graded-index core. This helps to selectively excite individual modes or a group of modes in the fibre 2 with the squeezing mechanism 3. It also helps to maintain mode shapes during tapering in the splice 10 enabling robust single mode excitation of the optical fibre 2.

Referring to FIG. 2, the optical fibre 2 can have a core diameter 18 of 50 µm, a 0.22 numerical aperture, and a glass cladding diameter 19 of between 250 µm to 500 µm. Preferably the ratio of the glass cladding diameter 19 to the core diameter 18 is at least 5, and more preferably at least 10, in order to avoid microbending and uncontrolled coupling between the optical modes.

Table 1 shows the pitch 7 calculated to couple efficiently between the different $LP_{p,q}$ optical modes in the 50 µm, 0.22 numerical aperture step index optical fibre where the pitch 7 does not vary along the length of the optical fibre. It can be seen that the pitch 7 needs to be 7.9 mm to couple efficiently between the $LP_{0,1}$ mode and the $LP_{1,1}$ mode. These modes will couple together using a squeezing mechanism 3 that bends the optical fibre 2 with the pitch 7. The $LP_{1,1}$ mode can be coupled into the $LP_{2,1}$ mode using a second mechanism 129 located between the first mechanism 3 and the distal end 16 of the optical fibre 2. The required pitch 7 is 6.0 mm. In both cases, the squeezing force 12 of the respective squeezing mechanism 3, 129 can be adjusted in order to obtain the desired amount of mode coupling between the optical modes. In particular, it is possible to couple into single higher-order modes at coupling efficiencies exceeding 95%. In order to couple into even higher-order modes, a third and possibly a fourth squeezing mechanism 3 is required, or the squeezing force 12 must be increased in order to generate spatial harmonics in the approximately sinusoidal perturbation of the optical fibre 2. Such squeezing forces can result in significant amounts of mode coupling, which can result in the laser radiation 13 at the distal end 16 of the optical fibre 2 having a top hat output profile.

TABLE 1 pitch in mm for coupling between the optical $LP_{p,q}$ modes

|  | $LP_{1,1}$ | $LP_{2,1}$ | $LP_{3,1}$ | $LP_{4,1}$ | $LP_{5,1}$ | $LP_{6,1}$ | $LP_{7,1}$ |
|---|---|---|---|---|---|---|---|
| $LP_{0,1}$ | <u>7.9</u> | 3.4 | 2.0 | 1.4 | 1.0 | 0.8 | 0.6 |
| $LP_{1,1}$ |  | <u>6.0</u> | 2.7 | 1.6 | 1.1 | 0.8 | 0.6 |
| $LP_{2,1}$ |  |  | <u>4.9</u> | 2.2 | 1.4 | 1.0 | 0.7 |
| $LP_{3,1}$ |  |  |  | <u>4.1</u> | 1.9 | 1.2 | 0.9 |
| $LP_{4,1}$ |  |  |  |  | <u>3.6</u> | 1.7 | 1.1 |
| $LP_{5,1}$ |  |  |  |  |  | <u>3.2</u> | 1.5 |
| $LP_{6,1}$ |  |  |  |  |  |  | <u>2.9</u> |

Alternatively or additionally, at least one of the squeezing mechanisms 3 can have a pitch 7 that is variable, and which is chirped along the length 8 of the squeezing mechanism 3. In order to transfer power between the modes using the coupling lengths that are underlined in Table 1, the pitch 7 of the squeezing mechanism 3 should have a period 7 varying by at least 7.9 mm at its input end (the end nearest the laser 1), to no more than 2.9 mm at its output end (the end nearest the distal end 16).

Figure 19:
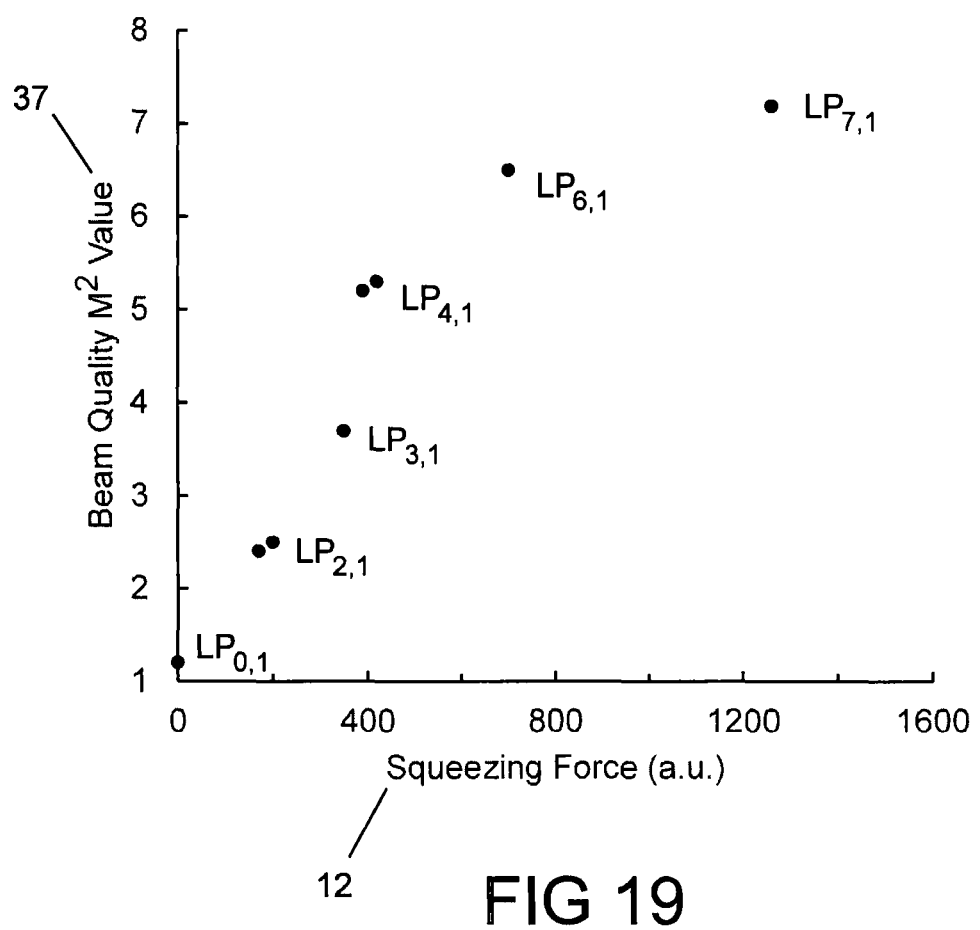
FIG. 19 shows the results of an experiment in which the fundamental mode was coupled to a higher order mode by a cascade process.

In an experiment, the optical fibre 2 had a 50 µm core diameter and a 0.22 numerical aperture. The pitch 7 of the squeezing mechanism 3 at the input end, that is, the end of the squeezing mechanism 3 that received the laser radiation 13 from the laser 1, had a pitch of 8 mm. The pitch 7 at its output end, the end that outputs the laser radiation 13 received from the laser 1, was 2.5 mm. As shown in FIG. 19, by adjusting the squeezing force 12, it was possible to tune the mode coupling between the $LP_{01}$ mode to the $LP_{7,1}$ mode. The cross-section of the laser radiation 13 emitted from the optical fibre 2 clearly had fourteen high-intensity lobes around its azimuth indicating a strong presence of the $LP_{7,1}$ mode. By increasing the squeezing force 12 starting from zero squeezing force, the squeezing mechanism 3 was able to output the $LP_{11}$ (not shown), $LP_{2,1}$, $LP_{3,1}$, $LP_{4,1}$, $LP_{5,1}$ (not shown), $LP_{6,1}$ and the $LP_{7,1}$ optical modes in sequence. The conversion efficiency for each mode could be tuned to approximately 90% to 100%. Without limiting the scope of the invention, it is believed that the $LP_{01}$ mode is coupled in turn to the $LP_{11}$, $LP_{2,1}$, $LP_{3,1}$, $LP_{4,1}$, $LP_{5,1}$, $LP_{6,1}$ and then the $LP_{7,1}$ optical modes. By adjusting the squeezing force 12 of the squeezing mechanism 3, any of the preceding modes could be tuned to appear at the distal end 16 of the optical fibre 2. A different $M^2$ value, mode profile and divergence were associated with each individual mode. The squeezing force 12 required was repeatable and approximately linear. When the squeezing mechanism 3 was inverted, that is the 2.9 mm pitch was orientated at the input end of the squeezing mechanism 3, then this cascaded nature of the mode coupling was not seen.

As shown with reference to FIG. 1, a long period grating 127 can optionally follow the first squeezing mechanism 3. The long period grating 127 can have a pitch 7 that is uniform along its length 8, or can have a pitch 7 that is chirped along its length 8. The long period grating 127 can comprise an optical fibre Bragg grating. Alternatively or additionally, the long period grating 127 can comprise a second squeezing mechanism 129 as shown in FIG. 1.

In an experiment, the pitch 7 of the second squeezing mechanism 129 had a variable pitch that was chirped along its length 8. The pitch 7 of the squeezing mechanism 129 at its input end, the end that receives the laser radiation 13 from the first squeezing mechanism 3, had a pitch 7 of 4.4 mm. The pitch 7 at its output end, the end that passes the laser radiation 13 to the distal end 16 of the optical fibre 2, was 4.0 mm. It was possible to couple the $LP_{0,1}$ mode into the $LP_{4,1}$ mode in the cascaded manner described above with the first squeezing mechanism 3, and then subsequently to couple the $LP_{4,1}$ mode into the $LP_{3,2}$ mode with the second squeezing mechanism 129. The $LP_{3,2}$ mode has two rings of high optical intensity with a $\cos^2(6\theta)$ or $\sin^2(6\theta)$ azimuthal dependence. The $LP_{3,2}$ mode has higher optical intensity near its centre than the $LP_{3,1}$ mode. Similarly, it was possible to couple the $LP_{0,1}$ mode into the $LP_{7,1}$ mode in the cascaded manner described above with the first squeezing mechanism 3, and then subsequently couple the $LP_{7,1}$ mode into the $LP_{5,3}$ mode. The $LP_{5,3}$ mode has three rings of high optical intensity with a $\cos^2(10\theta)$ or $\sin^2(10\theta)$ azimuthal dependence. The $LP_{5,3}$ mode has higher optical intensity near its centre than the $LP_{5,1}$ mode. The experiment demonstrated that the apparatus enables a Gaussian fundamental $LP_{0,1}$ mode to be output from the optical fibre 2, together with a series of ring-like mode profiles. The modes can be present individually or in combination. The apparatus can be used to output individual modes, and combinations of optical modes that can combine to form annular profiles with different annular thicknesses. Top hat (also known as flat-topped) profiles can also be produced by increasing the squeezing force 12 on the first squeezing mechanism 3 and/or the second squeezing mechanism 129 in order to increase the mode coupling. The technique is robust and predictable.

The second squeezing mechanism 129 of FIG. 1 can have a pitch 7 that is chirped along its length 8. In an experiment, the pitch 7 of the squeezing mechanism 3 at its input end which receives the laser radiation from the first squeezing mechanism 3 had a pitch of 3.5 mm. The pitch 7 at its output end which outputs the laser radiation 13 received from the first squeezing mechanism 3 was 2.0 mm. By adjusting the squeezing force 12 of the first and the second squeezing mechanisms 3, 129, it was possible to couple the $LP_{0,1}$ fundamental mode into a large set of modes. If the modes are approximately uniformly excited, then they will produce an output profile from the 50 µm core fibre that is approximately uniform across the core 31. By adjusting the squeezing force 12, different beam quality $M^2$ values could be obtained that were predictable. In particular, it was possible to achieve a top hat profile of the laser radiation 13 at the distal end 16 of the optical fibre 2. The $M^2$ value obtained is approximately linear with respect to the squeezing force 12.

Figure 20:
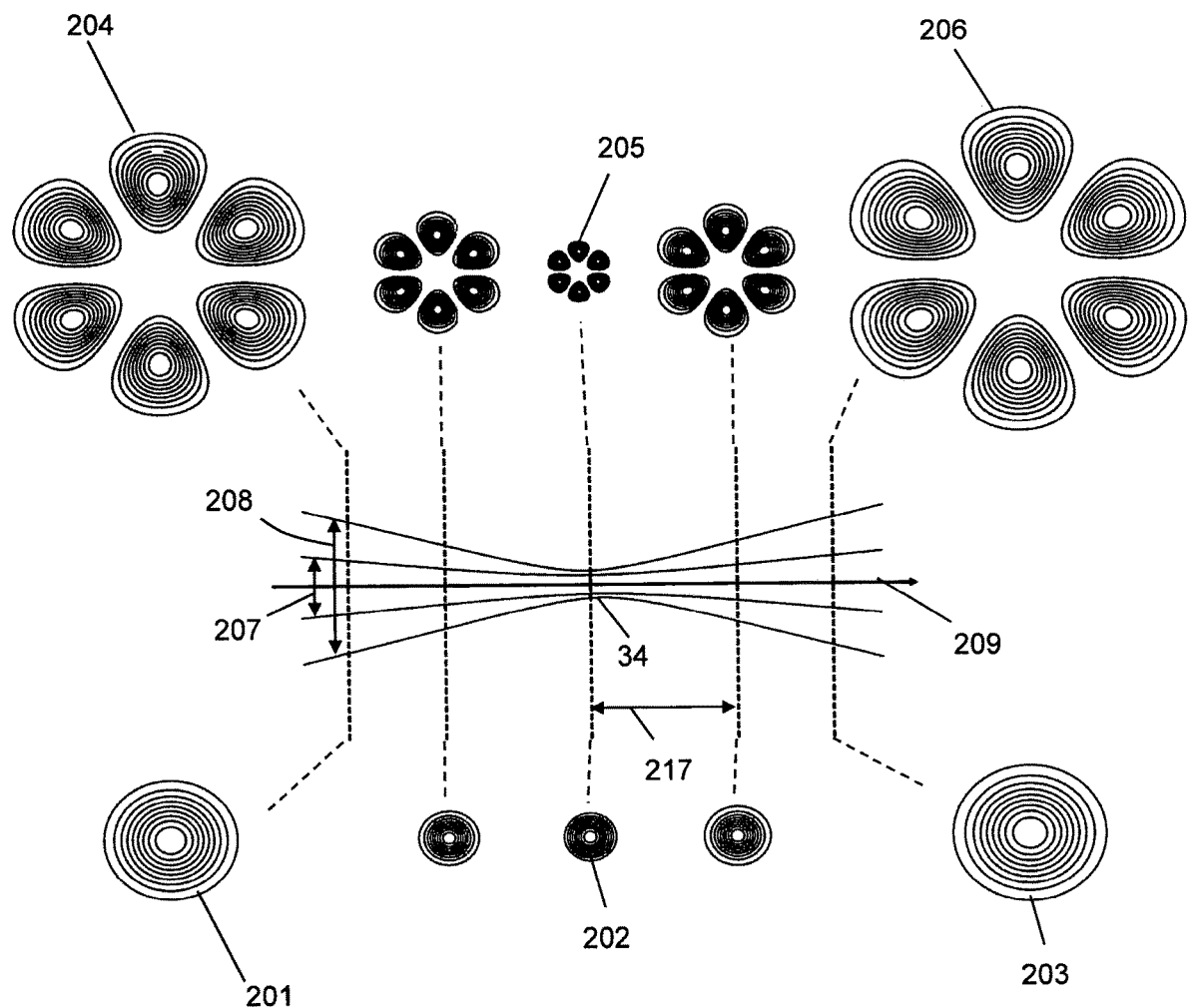
FIG. 20 shows the evolution of the fundamental $LP_{0,1}$ mode and the $LP_{3,1}$ through a beam waist.

FIG. 20 shows how the mode profiles of the fundamental $LP_{0,1}$ mode 201 and the $LP_{3,1}$ mode 204 evolve when focused to the beam waist 34 along an axis 209 when the lens 4 of FIG. 1 is not in place. The fundamental mode 201 and the $LP_{3,1}$ mode 204 diffract at different rates away from the beam waist 34. The beam diameter 207 of the fundamental mode 201 and the beam diameter 208 of the $LP_{3,1}$ mode are approximately equal at the beam waist 34, which is the near field. The beam diameter 207 is smaller than the beam diameter 208 away from the beam waist 34 in the far field. The fundamental $LP_{0,1}$ mode 201 has a far field 203 and a near field 202 which are both approximately Gaussian. Similarly, the $LP_{3,1}$ mode 204 has a far field 206 that has a similar profile to its near field 205. The near fields 202 and 205 have approximately the same beam waist diameters 35 shown with reference to FIG. 3. The far field 206 of the $LP_{3,1}$ mode 204 is in an annular ring surrounding the far field 203 of the fundamental mode 201. Higher order modes with the same mode order as the $LP_{3,1}$ mode will also diffract from the beam waist in substantially the same annular ring. Higher order modes with larger mode orders, such as the $LP_{7,1}$ mode, will diffract with higher divergence angles 36, and their far fields will be substantially within an annular ring surrounding the annular rings of the far fields of modes having lower mode orders. If the guided modes all have substantially the same optical powers, then the ensemble of modes will form an approximately top hat distribution of optical power at locations where their beam diameters 39 are approximately equal, and an approximately gaussian distribution at distances greater than the Rayleigh length 217 from the beam waist 34.

Referring to FIG. 3, it is seen that ring modes such as the $LP_{3,1}$ mode 204 have a ring profile in both the near field and the far field. Ring modes maintain a ring-shaped profile through the focus. Thus if the apparatus is operated such that it selects an individual ring mode, then this ring mode will be maintained through the beam waist 34. Similarly, if the apparatus is operated such that it selects an ensemble of individual ring modes, then these ring modes will be maintained through the beam waist 34.

The equations describing the Gaussian beam radius $\omega(z)$ as a function of distance z along the axis 209 can be written as follows:

$$\omega(z) = \omega_0 \left[1 + \left(\frac{z}{z_R^2}\right)^2\right]^{1/2}$$

where $\omega_0$ is the beam radius at the beam waist 34, and $z_R$ is the Rayleigh length. The beam waist diameter 35 at the beam waist 34, described with reference to FIG. 3, is equal to $2\omega_0$. The Rayleigh length $z_R$ corresponds to the distance along the axis 209 in which the Gaussian beam radius $\omega(z)$ increases by a factor of the square root of 2 from the Gaussian beam radius $\omega$ at the beam waist 34. The Rayleigh length $z_R$ for a laser beam having a beam quality $M^2$ value 37, a beam waist diameter 35 of $2\omega_0$, and a wavelength 5 of $\lambda$, is given by:

$$z_R = \frac{\pi \omega_0^2}{M^2 \lambda}$$

The Rayleigh length 217 of the fundamental $LP_{0,1}$ mode is shown in FIG. 20. Higher order modes have higher beam quality $M^2$ values 37, and thus shorter Rayleigh lengths. Higher order modes therefore diffract at a faster rate in comparison to the fundamental $LP_{0,1}$ mode.

FIGS. 21 to 24 show how the beam diameters 39 vary with distance from the focusing lens 53, shown in FIG. 1, for the LP0,1 mode 41, the LP2,1 mode 42, the LP4,1 mode 43, the LP6,1 mode 44, the LP8,1 mode 45, and the LP10,1 mode 46. The collimating lens 51, shown in FIG. 1, has a focal length of 100 mm, and the focusing lens 53 has a focal length of 200 mm. It is assumed that the modes 41-46 each have a waist diameter 35 $2\omega_0$=66 µm as they emerge from the distal end 16 of the optical fibre 2. The wavelength was assumed to be 1.06 microns. The Rayleigh length 217 of the fundamental $LP_{0,1}$ mode, assuming the beam quality $M^2$ value=1 is $z_R$=3.2 mm.

Figure 21:
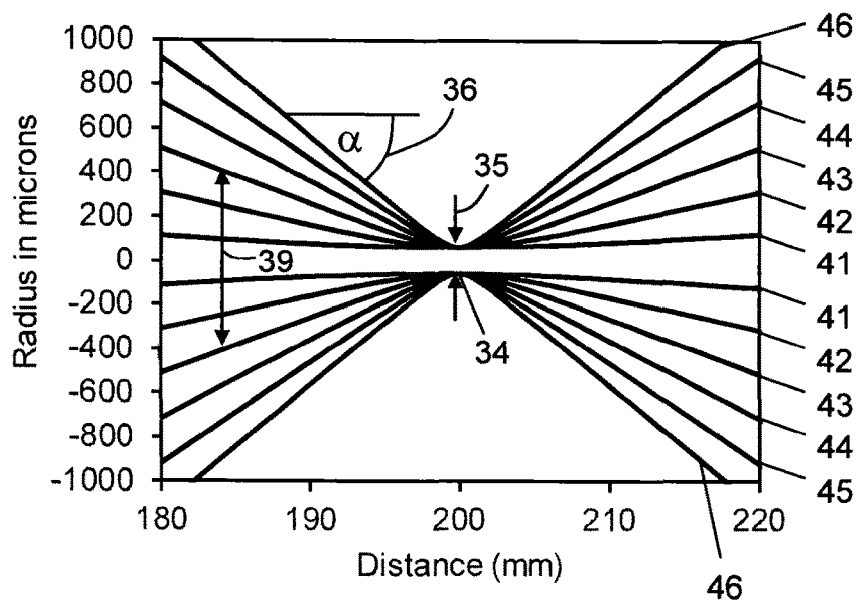
FIGS. 21 to 25 show the effect the choice and location of the lens at the distal end of the optical fibre has on the beam diameters for various optical modes after being focused by a focusing lens.

FIG. 21 shows the case when the lens 4, shown in FIG. 1, is not present. As discussed with reference to FIG. 3, the modes 41-46 each have substantially the same beam waist diameter 35, and divergence angles 36 that increase with the mode order of the optical modes 41-46. A desired beam divergence 36 can therefore be selected by adjusting the squeezing force 12 of the first squeezing mechanism 3.

The beam diameters 39 are all equal to each other at the beam waist 34, and are not equal to each other away from the beam waist 34. The squeezing force 12 of the first squeezing mechanism 3 and the squeezing force 12 of the second squeezing mechanism 129 can be adjusted to excite many more guided modes of the optical fibre such that the near field intensity profile 112, shown with reference to FIG. 11, at the beam waist 34 approximates a top hat distribution. As described with reference to FIG. 11, the far field distribution 113 will then approximate a Gaussian distribution.

Figure 22:
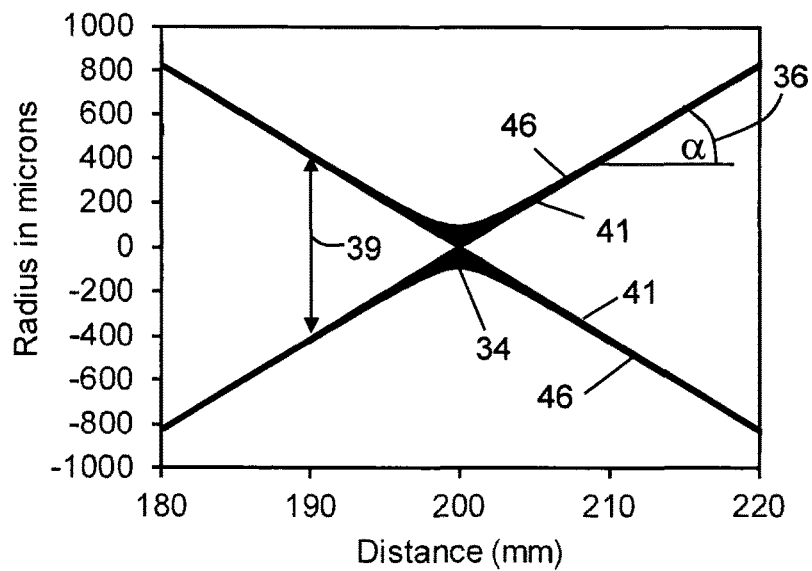
Figure 23:
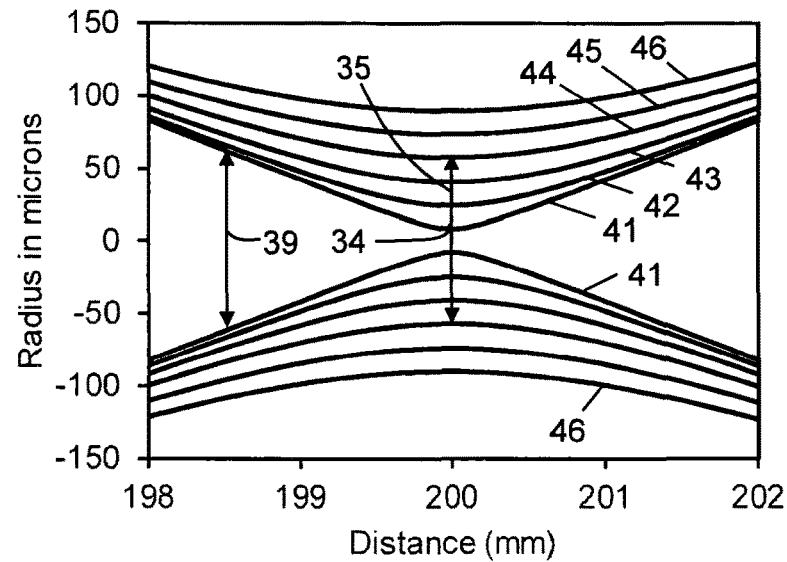

FIGS. 22 and 23 show the case when the lens 4, shown in FIG. 1, has a focal length of 400 microns, and where the distal end 16 of the optical fibre 2 is at the front focal plane 14 of the lens 4. The modes 41-46 each have substantially the same divergence angle 36, but different beam waist diameters 35. A desired beam waist diameter 35 can therefore be selected by adjusting the squeezing force 12 of the first squeezing mechanism 3.

The beam diameters 39 are all equal to each other away from the beam waist 34, and are equal to each at the beam waist 34. Thus as described with reference to FIG. 12, the squeezing force 12 of the first squeezing mechanism 3 and the squeezing force 12 of the second squeezing mechanism 129 can be adjusted to such that the intensity profile 123 away from the beam waist 34 in FIGS. 22 and 23 approximates a top hat distribution, and the intensity profile 122 at the beam waist 34 in FIGS. 22 and 23 approximates a Gaussian distribution.

Figure 24:
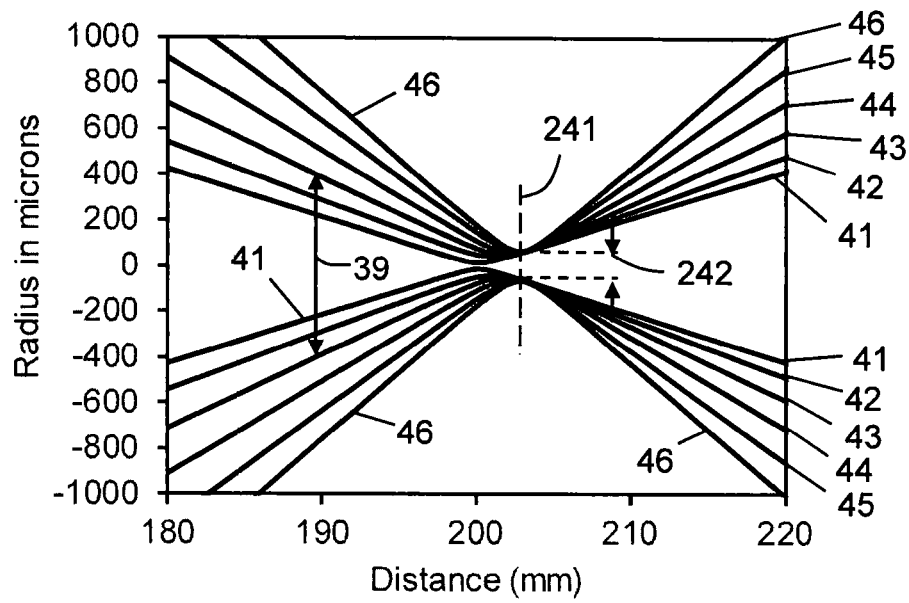

FIG. 24 shows the case when the lens 4, shown in FIG. 1, has a focal length of 800 microns, and where the distal end 16 of the optical fibre 2 and the lens 4 are separated by an optical distance of 1.6 mm. Both the beam waist diameters 35 and the beam divergence 36 for each of the modes 41-46 are different from each other. A desired beam waist diameter 35 and beam divergence 36 can therefore be selected by adjusting the squeezing force 12 of the first squeezing mechanism 3. Different combinations of the different beam waist diameters 35 and the beam divergences 36 can be achieved by selecting the lens 4 and its disposition with respect to the distal end 16 of the optical fibre 2.

Surprisingly, the beam waist diameters 35 of the individual optical modes 41-46 do not occur at the same distance from the focusing lens 52. The beam diameters 39 are all equal to a beam diameter of 242 at a distance 241 from the focusing lens 52. Thus as described with reference to FIG. 12, the squeezing force 12 of the first squeezing mechanism 3 and the squeezing force 12 of the second squeezing mechanism 129 can be adjusted such that the intensity profile 123 at the distance 241 approximates a top hat distribution. The intensity profile 122 away from the distance 241 resembles a Gaussian with a reduced intensity at its centre.

Figure 25:
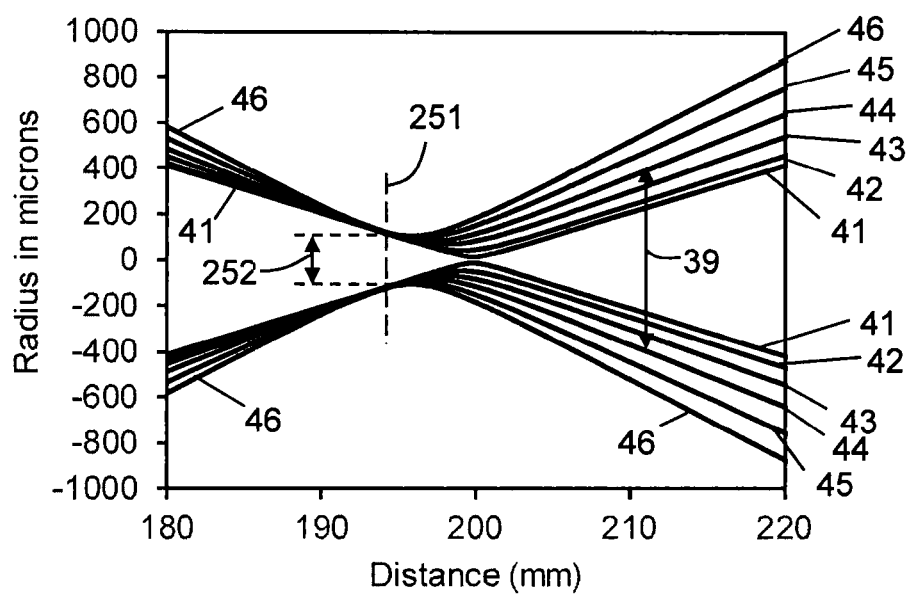

FIG. 25 shows the case when the lens 4, shown in FIG. 1, has a focal length of 800 microns, and where the distal end 16 of the optical fibre 2 and the lens 4 are separated by an optical distance of 400 microns. A desired beam waist diameter 35 and beam divergence 36 can therefore be selected by adjusting the squeezing force 12 of the first squeezing mechanism 3. Different combinations of the different beam waist diameters 35 and the beam divergences 36 can be achieved by selecting the lens 4 and its disposition with respect to the distal end 16 of the optical fibre 2.

Surprisingly, the beam waist diameters 35 of the individual optical modes 41-46 do not occur at the same distance from the focusing lens 52. The beam waist diameters 35, defined with respect to FIG. 3, for each of the modes 41-46 are different from each other, and do not occur at the same distance from the focusing lens 52. The beam diameters 39 are all equal to a beam diameter of 252 at a distance 251 from the focusing lens 52. Thus as described with reference to FIG. 12, the squeezing force 12 of the first squeezing mechanism 3 and the squeezing force 12 of the second squeezing mechanism 129 can be adjusted such that the intensity profile 123 at the distance 251 approximates a top hat distribution. The intensity profile 122 away from the distance 251 resembles a Gaussian with a reduced intensity at its centre.

Comparing the beam waist diameters 35 of the various optical modes in FIGS. 21 to 25 reveals that inclusion of the lens 4 enables different beam waist diameters 35 to be selected by adjusting the squeezing force 12 of the first squeezing mechanism 3. The lens 4 is preferably located within two Rayleigh lengths 217 from the distal end 16 of the optical fibre 2. More preferably, the lens 4 is located within one Rayleigh length 217. More preferably still, within half the Rayleigh length 217.

The squeezing force 12 described with reference to FIGS. 21 to 25 can be adjusted to select individual optical modes 41 to 46, or combinations of the optical modes 41 to 46. The squeezing force 12 can be adjusted to switch between individual optical modes 41 to 46, combinations of the optical modes 41 to 46, or between individual optical modes 41 to 46 and combinations of the optical modes 41 to 46.

The apparatus described with reference to FIGS. 1 to 25 can be configured to enable at least one of a desired beam waist diameter 35 and a desired divergence angle 36 to be selected by adjusting the squeezing force 12 of the first squeezing mechanism 3. As shown in FIG. 21, when no lens 4 is present, the apparatus of FIG. 1 can be configured to select a desired divergence angle 36 by adjusting the squeezing force 12 of the first squeezing mechanism 3. As shown in FIGS. 22 and 23, when the lens 4 is included in the apparatus of FIG. 1 and is located such that the distal end 16 of the optical fibre 2 is at the front focal plane 14 of the lens 4, then the apparatus can be configured to select a desired beam waist diameter 35 by adjusting the squeezing force 12 of the first squeezing mechanism 3. Inclusion of the second squeezing mechanism 129 allows an even greater degree of choice. Higher mode coupling can be achieved by controlling the squeezing force 12 of the second squeezing mechanism 129, thus enabling intensity distributions that approximate top hat profiles, or annular or ring profiles, at any distance from the focusing lens 53 through the beam waist 34 of the fundamental mode 41, and at distances beyond the beam waist 34.

Referring again to FIG. 1, the squeezing mechanism 3 may include at least one actuator 55. The actuator 55 may comprise an electric motor and/or an electromagnet. The actuator 55 may comprise a ratchet. Application of an electrical signal can be used to provide the squeezing force 12 via the actuator 55. The actuator 55 may also be used to vibrate the squeezing mechanism 3 in order to cause azimuthal averaging of the intensity of the optical mode or modes.

The apparatus may include a controller 75 for controlling the actuator 55 and thereby controlling the squeezing force 12. The controller 75 may contain a memory 76 comprising information concerning material parameters. Preferably, the memory 76 contains information enabling signals driving the actuators 31 to be selected depending on the parameters of the material 11. The parameters may include the type of the material 11 and its thickness 124. This is a particularly useful aspect of the invention as it allows the divergence 36 of the laser radiation 13 and the beam waist diameter 35 of the focused laser radiation 13 to be controlled by controlling the signal to the actuator 55. It therefore allows relatively expensive industrial lasers 1 to be tuned over a wide range of laser processing parameters automatically depending on the material being processed.

The apparatus of the invention can therefore be used to switch the laser radiation 13 between the fundamental Gaussian mode, individual or combinations of individual higher-order modes, and a top hat distribution comprising a plurality of optical modes. Moreover, by imaging the far field of the laser radiation 13 at the distal end 16 of the optical fibre with the lens 4, enables the laser radiation 13 to be switched between optical modes having different beam waist diameters 35. The ability to reliably image ring modes having azimuthal variations in intensity, such as the $LP_{5,1}$ or the $LP_{9,1}$ mode, reliably onto the material 11 provides important advantages in the cutting and welding of materials 11. Such modes have novel and interesting interactions with certain materials. For example, it is possible to optimize combinations of piercing speed, cutting speed, and edge quality by selecting individual modes or ensembles of individual modes. The optimization process may include optimizing the relative position of the material 11 with respect to the focusing lens 53. The beam waist 34 may be positioned between the material 11 and the focusing lens 53, on the surface 17 of the material 11, within the material 11, or the other side of the material 11 from the focusing lens 53. Interestingly, different ones of the optical modes provide the optimal results for piercing, cutting speed, and edge quality. The optimal choice can be different for different materials and thicknesses of materials.

Figure 26:
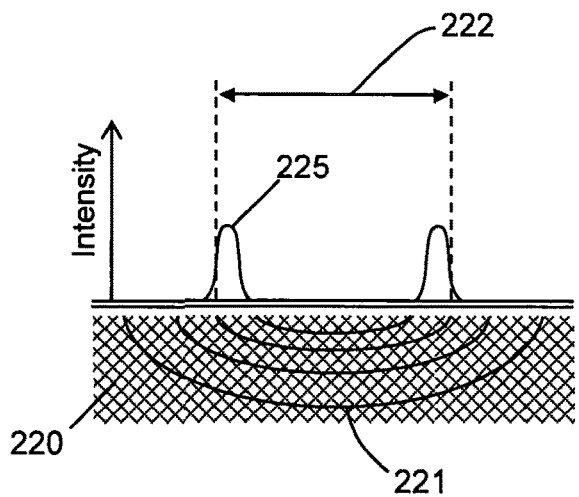
FIG. 26 shows the temperature profile of a workpiece after being irradiated by a ring mode.
Figure 27:
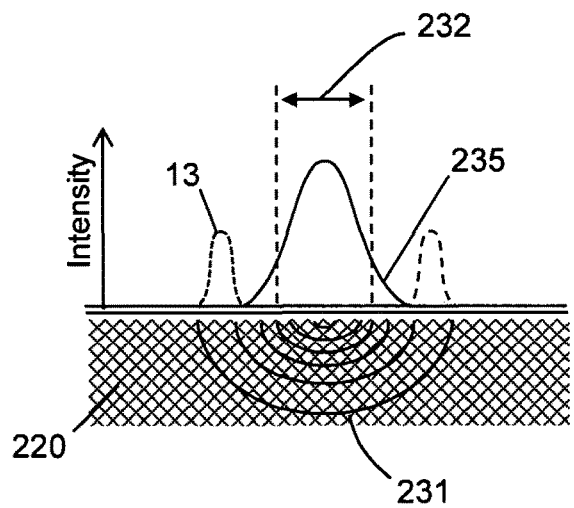
FIG. 27 shows the temperature profile of a workpiece after being irradiated by a fundamental mode.

An example application is one in which the material 11 is pre-processed prior to the main processing. FIG. 26 shows a ring mode 225 being used to preheat a material, such as silicon, in which material absorption increases with temperature. FIG. 26 shows the temperature profile 221 of a workpiece 220 under irradiation from a ring mode 225. The temperature profile 221 is uniform inside the ring and consequently, the induced stress in the centre of the irradiated area is reduced. The apparatus of the invention is then used to switch the laser radiation 13 to the fundamental $LP_{0,1}$ mode 235, as shown in FIG. 27. The spot size 232 of the fundamental mode 234 is arranged to be smaller than the spot size 222 of the ring mode 225. As described with reference to FIGS. 4 and 5, this can be achieved by using the lens 4 on the distal end 16 of the optical fibre 2. The result is that the work piece 220 can be processed more accurately and with less damage than without the pre-heating step. Example processes include cutting, drilling, or cutting or forming links in semiconductor circuits.

The apparatus of the invention can be used to provide the optical spot size and divergence of the laser radiation 13 to pierce, cut, weld, drill, sinter, mark, or engrave materials. The apparatus can have monitoring equipment to monitor the properties of the laser radiation 13, and thus control the actuators 31 to give the required process parameters.

It is to be appreciated that the embodiments of the invention described above with reference to the accompanying drawings have been given by way of example only and that modifications and additional components may be provided to enhance performance. Individual components shown in the drawings are not limited to use in their drawings and they may be used in other drawings and in all aspects of the invention. The invention also extends to the individual components mentioned and/or shown above, taken singly or in any combination.

The invention claimed is:

1. A method for laser processing a material, which method comprises:
   providing a laser that emits laser radiation;
   providing an optical fibre through which the laser radiation is able to propagate in a first optical mode, a second optical mode, and a third optical mode; and
   coupling the laser radiation to the first optical mode of the optical fibre; wherein the third optical mode has a higher mode order than a mode order of the second optical mode; and
   the mode order of the second optical mode is higher than a mode order of the first optical mode;
   the method being characterized by the following steps:
   providing a coupler that is configured to provide repeated switching of the laser radiation propagating in the first optical mode to laser radiation propagating in the second optical mode, and to provide repeated switching of the laser radiation propagating in the second optical mode to laser radiation propagating in the third optical mode and thereby enabling an output beam profile and a spot size of the laser radiation when imaged onto the material to be selected depending on the laser processing to be performed on the material; the method further comprising:
   selecting the third order mode dependent on the laser processing to be performed on the material;
   causing the laser radiation to propagate along the optical fibre in the first optical mode;
   operating the coupler to switch the laser radiation propagating along the optical fibre in the first optical mode to the laser radiation propagating in the second optical mode;
   operating the coupler to switch the laser radiation propagating along the optical fibre in the second optical mode to the laser radiation propagating in the third optical mode; and
   laser processing the material with the laser radiation.

2. The method according to claim 1, wherein at least 75% of the laser radiation propagating in the first optical mode is switched to the third optical mode by operation of the coupler.

3. The method according to claim 1, wherein the laser radiation propagating in the first optical mode is switched to a plurality of optical modes including the third optical mode thus forming a top-hat optical-power distribution of the laser radiation.

4. The method according to claim 1, wherein:
   the coupler comprises at least one squeezing mechanism comprising a periodic surface defined by a pitch;
   the periodic surface is located adjacent to the optical fibre; and
   the squeezing mechanism is configured to squeeze the periodic surface and the optical fibre together with a squeezing force.

5. The method according to claim 1, and including the step of providing a controller to apply a defined control signal to the coupler for selecting different optical output modes.

6. The method according to claim 1, and including the step of selecting the first optical mode, and piercing the material with the laser radiation.

7. The method according to claim 6, and wherein the step of laser processing the material comprises selecting the third optical mode, and cutting the material with the laser radiation.

8. The method according to claim 6, and including the step of switching the laser radiation to a top-hat optical-power distribution, and cutting the material with the laser radiation.

9. The method according to claim 1, and including the step of welding the material with the laser radiation.

10. The method according to claim 1, and including the step of sintering the material with the laser, wherein the material prior to sintering is in the form of a metallic powder.

11. The method according to claim 1, wherein the coupler switches at least 75% of the laser radiation emitted from the optical fibre from the first optical mode to the third optical mode.

* * * * *